US011587170B1

(12) United States Patent
Jenkins et al.

(10) Patent No.: US 11,587,170 B1
(45) Date of Patent: Feb. 21, 2023

(54) SYSTEMS AND METHODS FOR MANAGING A RENEWABLE POWER ASSET

(71) Applicant: Form Energy, Inc., Somerville, MA (US)

(72) Inventors: Benjamin Michael Jenkins, Durham, NH (US); Aly Eldeen O. Eltayeb, Boston, MA (US); Marco Ferrara, Boston, MA (US)

(73) Assignee: Form Energy, Inc., Somerville, MA (US)

( * ) Notice: Subject to any disclaimer, the term of this patent is extended or adjusted under 35 U.S.C. 154(b) by 0 days.

(21) Appl. No.: 17/838,665

(22) Filed: Jun. 13, 2022

Related U.S. Application Data

(63) Continuation of application No. 16/892,942, filed on Jun. 4, 2020, now Pat. No. 11,416,936.

(Continued)

(51) Int. Cl.
| | |
|---|---|
| *G06Q 10/06* | (2012.01) |
| *G06Q 40/04* | (2012.01) |
| *G06Q 50/06* | (2012.01) |
| *G06Q 10/04* | (2023.01) |
| *G06Q 10/0631* | (2023.01) |
| *H02J 3/38* | (2006.01) |
| *H02J 3/32* | (2006.01) |
| *G05B 13/04* | (2006.01) |
| *G05B 13/02* | (2006.01) |
| *G06Q 10/0637* | (2023.01) |
| *G06Q 50/08* | (2012.01) |

(52) U.S. Cl.
CPC .......... *G06Q 40/04* (2013.01); *G05B 13/027* (2013.01); *G05B 13/042* (2013.01); *G06Q 10/04* (2013.01); *G06Q 10/06314* (2013.01); *G06Q 10/06315* (2013.01); *G06Q 10/06375* (2013.01); *G06Q 50/06* (2013.01); *H02J 3/32* (2013.01); *H02J 3/381* (2013.01); *G06Q 50/08* (2013.01); *H02J 2300/20* (2020.01)

(58) Field of Classification Search
CPC ........ G06Q 10/06; G06Q 40/04; G06Q 50/06
USPC ....................................................... 705/7.24
See application file for complete search history.

(56) References Cited

U.S. PATENT DOCUMENTS

| | | | |
|---|---|---|---|
| 10,574,087 B2 * | 2/2020 | Carter .................. | G05B 13/041 |
| 11,416,936 B1 * | 8/2022 | Jenkins ................ | G05B 13/027 |

(Continued)

*Primary Examiner* — Nga B Nguyen
(74) *Attorney, Agent, or Firm* — Clocktower Law LLC; Erik J. Heels; Michael A. Bartley

(57) ABSTRACT

Systems, methods, and devices may enable management of a renewable power asset. A control device may generate a Day-Ahead (DA) pricing model, a Real-Time (RT) pricing model and a renewable generation model for the renewable power asset. Optimal DA commitments may be determined, and an optimal RT schedule estimated. A DA power delivery strategy and an RT power delivery strategy may be determined. The determined DA and RT power delivery strategies may be evaluated based on obtained real power prices. The DA and RT power delivery strategies may be redetermined, and the renewable power asset may be controlled to deliver power the DA and RT power delivery strategies. The value of the renewable power asset may be maximized while bounding financial risks and returns associated with scheduling the renewable power asset as tailored to risk preferences of the renewable power asset owner or operator.

5 Claims, 5 Drawing Sheets

Related U.S. Application Data

(60) Provisional application No. 62/857,437, filed on Jun. 5, 2019.

(56) References Cited

U.S. PATENT DOCUMENTS

| | | | |
|---|---|---|---|
| 2014/0039710 A1* | 2/2014 | Carter | G05F 1/67 700/291 |
| 2018/0233922 A1* | 8/2018 | Sun | G06Q 10/04 |
| 2019/0123580 A1* | 4/2019 | Bindea | H02J 13/00028 |
| 2019/0147551 A1* | 5/2019 | Sun | H02J 3/008 700/291 |
| 2020/0126168 A1* | 4/2020 | Macklis | H02J 7/0013 |

* cited by examiner

SYSTEMS AND METHODS FOR MANAGING A RENEWABLE POWER ASSET

CROSS-REFERENCE TO RELATED APPLICATIONS

This utility patent application is a continuation of U.S. patent application Ser. No. 16/892,942, filed Jun. 4, 2020, titled "Systems And Methods For Managing A Renewable Power Asset", and naming inventors Benjamin Michael Jenkins, Aly Eldeen O. Eltayeb, and Marco Ferrara, which claims priority from U.S. provisional patent application Ser. No. 62/857,437, filed Jun. 5, 2019, titled "Managing A Renewable Power Asset", and naming inventors Benjamin Michael JENKINS, Aly Eldeen O. ELTAYEB, and Marco FERRARA.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2022, Form Energy, Inc.

BACKGROUND

Field of Technology

This relates to renewable power assets, and more specifically to managing power production and storage based on energy markets.

Background

Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as short duration energy storage and long duration energy storage (LODES) systems.

In a price environment with Day-Ahead and Real-Time prices, the optimal dispatch of a renewable asset (for example, a solar or wind power generation facility, which may also include an energy storage asset) suffers from the forecast uncertainty of production volumes of the asset and the forecast uncertainty of market prices, where prices may in part be related to production volumes. In a regulated environment with requirements to deliver reliable power at the lowest cost, the optimal scheduling of a renewable asset (for example, a solar or wind power generation facility, which may also include an energy storage asset) suffers from the forecast uncertainty of production volumes of the asset and the forecast uncertainty of overall electricity demand and availability and cost of supplying electricity from other generation assets.

A Day-Ahead (DA) energy market enables market participants to commit to buy or sell wholesale electricity one day before the operating day, to help avoid price volatility. A Real-Time (RT) energy market enables market participants to buy and sell wholesale electricity during the course of an operating day. The RT energy market may balance differences between DA commitments and the actual RT demand for and production of electricity. The RT energy market may produce a separate, second financial settlement. In some implementations, the second financial settlement may establish a real-time locational marginal price (LMP) that may be paid or charged to participants in the DA energy market for demand or generation that deviates from the day-ahead commitments.

A need exists to support the adoption of combined power generation, transmission, and storage systems (e.g., a power plant having a renewable power generation source paired with a bulk energy storage system and co-optimized transmission facilities at any of the power plant and the bulk energy storage system).

DESCRIPTION OF PRIOR ART

U.S. Pat. No. 10,266,034 (issued 2019 Apr. 30, naming inventor Marhoefer, titled "Virtual power plant system and method incorporating renewal energy, storage and scalable value-based optimization") discloses, in the Abstract, "Methods and systems provided for creating a scalable building block for a virtual power plant, where individual buildings can incorporate on-site renewable energy assets and energy storage and optimize the acquisition, storage and consumption of energy in accordance with a value hierarchy. Each building block can be aggregated into a virtual power plant, in which centralized control of load shifting in selected buildings, based on predictive factors or price signals, can provide bulk power for ancillary services or peak demand situations. Aggregation can occur at multiple levels, including developments consisting of both individual and common renewable energy and storage assets. The methods used to optimize the system can also be applied to 'right size' the amount of renewable energy and storage capacity at each site to maximize return on the capital investment."

United States Patent Application Publication 2017/0228834 (published 2017 Aug. 10, naming inventor Hoff, titled "Generating A Risk-Adjusted Probabilistic Forecast Of Renewable Power Production For A Fleet With The Aid Of A Digital Computer") discloses, in the Abstract, "Probabilistic forecasts of the expected power production of renewable power sources, such as solar and wind, are generally provided with a degree of uncertainty. The expected power production for a fleet can be projected as a time series of power production estimates over a time period ahead of the current time. The uncertainty of each power production estimate can be combined with the costs and risks associated with power generation forecasting errors, and displayed or visually graphed as a single, deterministic result to assist power grid operators (or planners) in deciding whether to rely on the renewable power source."

"Twenty years of linear programming based portfolio optimization" from authors Renata Mansini, Wlodzimierz Ogryczak, and M. Grazia Speranza, published Apr. 16, 2014 in European Journal of Operational Research Volume 234, Issue 2, pages 518-535 discloses, in the Abstract, "Markowitz formulated the portfolio optimization problem through two criteria: the expected return and the risk, as a measure of the variability of the return. The classical Markowitz model uses the variance as the risk measure and is a quadratic programming problem. Many attempts have been made to linearize the portfolio optimization problem. Several different risk measures have been proposed which are computationally attractive as (for discrete random variables) they give rise to linear programming (LP) problems. About twenty years ago, the mean absolute deviation (MAD)

model drew a lot of attention resulting in much research and speeding up development of other LP models. Further, the LP models based on the conditional value at risk (CVaR) have a great impact on new developments in portfolio optimization during the first decade of the 21st century. The LP solvability may become relevant for real-life decisions when portfolios have to meet side constraints and take into account transaction costs or when large size instances have to be solved. In this paper we review the variety of LP solvable portfolio optimization models presented in the literature, the real features that have been modeled and the solution approaches to the resulting models, in most of the cases mixed integer linear programming (MILP) models. We also discuss the impact of the inclusion of the real features."

None of the above provides 1) systems to support the optimized design and operation of renewable power generation and transmission, 2) with or without energy storage assets, 3) based on maximizing energy generation and dispatch value, or minimizing energy generation, storage, and dispatch costs, 4) within a rigorous framework that precisely accounts for investor or operator risk and return preferences, 5) through linear programming computable optimizations. What is needed, therefore, is a solution that overcomes the above-mentioned limitations and that includes the features enumerated above.

BRIEF SUMMARY

Systems, methods, and devices may enable management of a renewable power asset (for example, a renewable power generation asset, such as a solar or wind power generation facility, which may optionally also include an energy storage facility). A processor of a control device for a renewable power asset may generate one or more of a Day-Ahead (DA) pricing model for a renewable power asset and a Real-Time (RT) pricing model for the renewable power asset. The processor may determine optimal DA commitments for the renewable power asset, and the processor may estimate an optimal RT schedule for the renewable power asset. The processor may determine a DA power delivery strategy and an RT power delivery strategy for the renewable power asset. The processor may obtain real power prices and may evaluate the determined DA power delivery strategy and the determined RT power delivery strategy based on the obtained real power prices. The processor may redetermine one or more of the DA power delivery strategy and the RT power delivery strategy, and the processor may control the renewable power asset to deliver power from renewable power asset based on one or more of DA and RT power delivery strategies. In a price environment with DA and RT prices, the optimal dispatch of a renewable power asset suffers from the forecast uncertainty of prices, which may in part be driven by uncertainty in production volumes of the renewable power generation asset. The processor may maximize the value of the renewable power asset and bound financial risks associated with scheduling the renewable power asset. The processor may further perform such maximization while balancing between risks and returns tailored to risk preferences of the renewable power asset owner or operator.

The processor may determine a prediction of DA power generation supply and demand that may include the renewable power asset. The processor may determine optimal DA commitments for the renewable power asset and may estimate an optimal RT schedule for the renewable power asset. The processor may determine a DA power delivery schedule for the renewable power asset and an RT power delivery schedule for the renewable power asset. The processor may obtain real power prices and may evaluate the determined DA power delivery strategy and the determined RT power delivery strategy based on the obtained real power prices. The processor may redetermine one or more of the DA power delivery schedule and the RT delivery schedule. The processor may control the renewable power asset to deliver power from renewable power asset based on one or more of DA and RT power delivery strategy.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1A:
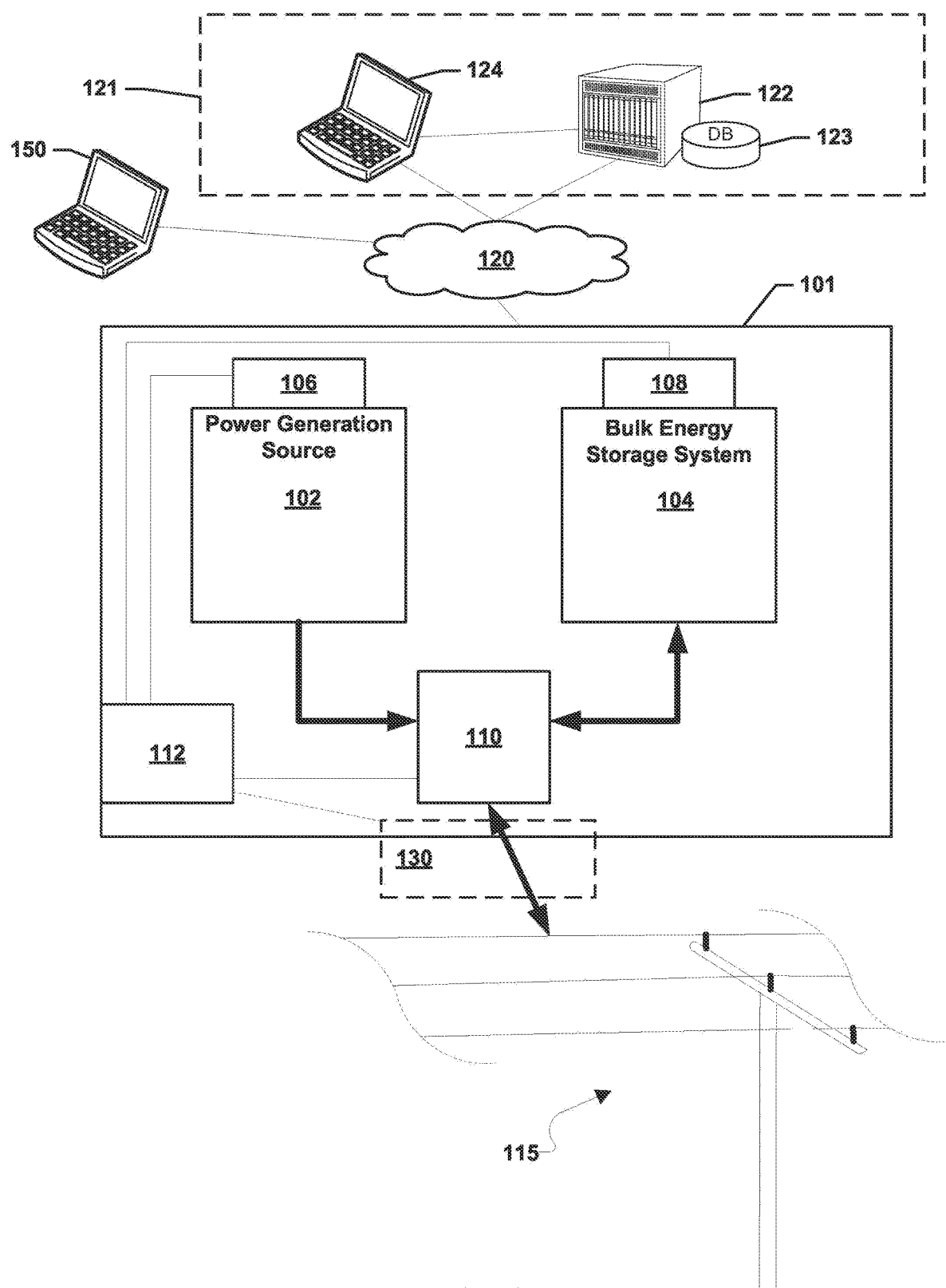
FIG. 1A is a system block diagram of a combined power generation, transmission and storage system.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

A "computing device" refers to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, controllers, and similar electronic devices which include a programmable processor, memory, and circuitry configured to perform operations as described herein.

A "server" refers to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

A processor refers to a general purpose processor, a digital signal processor (DSP), an application specific integrated circuit (ASIC), a field programmable gate array (FPGA) or other programmable logic device, discrete gate or transistor logic, discrete hardware components, or any combination thereof, within a computing device. A general-purpose processor may be a microprocessor, but, in the alternative, may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A computer network refers to a 3G network, 4G network, 5G network, local area network, wide area network, core network, the Internet, or any combinations thereof.

A "renewable power asset" includes one or more renewable power generation assets and zero or more energy storage assets. A "renewable power asset" may also be referred to as a "node".

A "power generation system" includes one or more power generation sources and zero or more energy storage assets. Each power generation source may be a renewable power generation asset or a traditional non-renewable generation asset such as gas, coal, or nuclear. A power generation system may also be referred to as a "node".

A renewable power generation asset is a power generator using a renewable resource, such as, but not limited to, wind, solar, hydro, biomass, ocean thermal, and geothermal generators.

An Energy Storage asset is equivalent to a bulk energy storage system.

A bulk energy storage system is a short duration energy storage, or long duration energy storage (LODES), and may include one or more batteries.

A Day Ahead Energy Market lets participants (energy generators and load serving entities) commit to buy or sell electricity one day before the operating day. The price committed is the Day Ahead (DA) price.

A Real Time Energy Market lets participants (energy generators and load serving entities) buy and sell electricity during the course of an operating day, and balances differences between Day Ahead commitments and actual real-time demand. The price exchanged within the Real Time Energy Market is the Real Time (RT) price.

In a regulated environment, also referred to as a regulated energy market, one entity owns and operates production, infrastructure, and delivery of electricity. Electricity pricing rates are set by public commissions and not a competitive market.

An Operating Strategy, or just "strategy", is a mathematical/algorithmic framework for operating a renewable power asset.

An Operating Schedule, or just "schedule", is an actual power output schedule for a renewable power asset; i.e., when to ramp-up, generate, and ramp-down for a generator; when to charge and when to output for a storage asset; when to transmit for a transmission asset.

Renewable curtailment is reduction of output of a renewable generation resource from maximum output, and may be controlled based on an operating schedule.

"Prediction" and "forecast" are used interchangeably herein.

The following variables and operations are defined as used throughout the description. Bold notation indicates vector variables that span an optimization time horizon.

$\tau$ is defined to be a transpose operation.

• is defined to be a scalar product operation.

J is defined to be a number of discretized time steps in optimization horizon, indexed by $1 \leq j \leq J$.

N is defined to be the number of possible DA price scenarios, indexed by $1 \leq n \leq N$.

M is defined to be the number of possible renewable generation scenarios, indexed by $1 \leq m \leq M$.

K is defined to be the number of possible RT price scenarios, indexed by $1 \leq k \leq K$.

I is defined to be the number of possible power demand scenarios, indexed by $1 \leq i \leq I$.

T is defined to be the number of total scenario permutations in given optimization, indexed by $1 \leq t \leq T$.

$q_{DA}$ is defined to be the DA commitments.

$q_X$ is defined to be the RT curtailment of renewable generation.

$p_{DA}$ is defined to be a realized DA price.

$p_{DA,n}$ is defined to be the DA price forecast in the $n^{th}$ scenario.

$q_{RT}$ is defined to be the RT renewable generation.

$q_{RT,m}$ is defined to be the renewable generation forecast in the $m^{th}$ scenario.

$p_{RT}$ is defined to be a RT price.

$p_{RT,k}$ is defined to be the RT price forecast in the $k^{th}$ scenario.

$(q_{RT,m} - q_{DA} - q_X)$ is defined to be the deviation from DA commitments.

$\delta_{RT,n,m,k}$ is defined to be the RT penalties, which is a function of deviation from DA commitments and market prices. For example, penalties may be a multiplier of the absolute value of the deviation from DA commitments.

$w_{n,m,k}$ is defined to be the joint probability of $(p_{DA} = p_{DA,n}; q_{RT} = q_{RT,m}; p_{RT} = p_{RT,k})$.

$\gamma_m$ is defined to be a factor to bias optimization towards specific generation forecast scenarios.

$\lambda$ is defined to be a risk tolerance factor (with 0 being no risk aversion).

$\overline{w_{m,k}}$ is defined to be the Joint probability of $(q_{RT} = q_{RT,m}; p_{RT} = p_{RT,k})$ given realized $p_{DA}$.

$d_{RT}$ is defined to be the RT optimal discharge schedule of a storage system.

$c_{RT}$ is defined to be the RT optimal charge schedule of a storage system.

SOC is defined to be the State of charge of storage system.

$(q_{RT,m} + d_{RT} - c_{RT} - q_{DA} - q_X)$ is defined to be the deviation from DA commitments, including energy storage.

$l_{RT,i}$ is defined to be the demand forecast in the $i^{th}$ scenario.

$(l_{RT,i} - q_{RT,m} - d_{RT} + c_{RT} + q_X)$ is defined to be Residual demand.

$c_{RT,i,m}$ is defined to be the cost of residual demand, which is a function of residual demand representing the short term running cost of a marginal generator called upon fulfilling the last unit of residual demand.

$w_{i,m}$ is defined to be the joint probability of $(l_{RT} = l_{RT,i}; q_{RT} = q_{RT,m})$.

$P_{ESS}$ is defined to be storage rated power.

$c_P$ is defined to be storage unit power cost amortized in the optimization horizon.

$E_{ESS}$ is define to be storage rated energy.

$c_E$ is defined to be storage unit energy cost amortized in the optimization horizon.

Operation

Systems, methods, and devices may enable the efficient scheduling of a renewable power asset. Methods may be implemented in software or hardware and executed by a processor of a computing device directing or operating with one or more control devices to enable a renewable power asset to optimize operation of the renewable power asset, including determination of bounds and the active management of financial risks associated with scheduling and operation of the renewable power asset.

The processor may generate forecasts of Day-Ahead (DA) and Real-Time (RT) prices of power that may be provided from a renewable power asset. The processor may generate the forecasts using, for example, prediction techniques such as regression that includes information from a variety of sources including one or more of historical weather and weather forecasts, historical power supply, historical power demand, historical nodal transmission characteristics, and well as indicators of market sentiment. For example, forecasts of expected demand may be used as indicators of market sentiment by high or low demand correlating with high or low energy prices. The processor may obtain data pertaining to a node under consideration including historical DA and RT prices, total quantities committed at DA planning and total local load, historical renewable generation and day-ahead estimated renewable generation with associated exceedance probabilities, historical temperature, plant outages, and/or other similar factors. The processor may determine additional information such as on/off peak, weekday/weekend binary signals, and season or month categorical signals. The processor may augment the historical DA and RT pricing information using a fundamental model that may be based at least in part on a supply stack in the region of the node under consideration, which may provide additional fidelity. Examples of such fundamental models are linear and mixed-integer linear programs routinely used in production cost models.

The processor may use all or a subset of the data to generate a mathematical model (such as an autoregressive-moving-average model with exogenous inputs or "ARMAX", a feedforward neural network, a recurring neural network, or similar advanced regression models known to those skilled in the art) which predicts the DA and/or RT pricing for multiple prediction horizons. By employing a mathematical model, the processor may extrapolate into the future historical trends of sensitivity to different variables to enable the generation of multiple future scenarios with corresponding probabilities. The processor may employ one or more statistical descriptions of historical behavior not captured in the mathematical model, also known as residuals, to add stochastic information back on the model output, to accurately simulate data with properties which resemble a true signal.

The processor may use the forecasts of DA and RT prices to identify optimal DA commitments and expected optimal power curtailment of the renewable power asset and optionally also the expected optimal dispatch of an energy storage asset. The processor may apply the determined DA commitments (which may be held as fixed), may determine actual DA prices, and may use RT forecasts (e.g., with a rolling horizon) to estimate an optimal RT schedule of the renewable power asset and of an energy storage asset, including power curtailment, across a range of scenarios that may be weighted by their probability.

The processor may determine an optimal DA strategy and/or an optimal RT strategy (e.g., by leveraging a mathematical method, such as mathematical programming) that may reflect, for example, preferences of an asset owner of risk-adjusted return. The determined RT strategy may include scheduling a renewable RT delivery and incurring penalties at times when RT schedule may be short of DA commitments. The determined RT strategy also may include buying power from RT markets to fill DA commitments at times when an RT schedule is short of the DA commitments.

Within a regulated environment, the processor may use information, as detailed above in generation of DA and RT price forecasts, to generate forecasts of energy supply, demand, renewable generation, and expected cost of energy generation. Using these forecasts, the processor may identify one or more optimal RT operating strategy of the renewable power asset, energy storage asset, and other power generation assets to minimize overall expected generation and storage cost while meeting the anticipated power demand.

Referring to FIG. 1A, in the preferred embodiment power generation system 101 may include a combined power generation, transmission, and storage system, such as a power plant including one or more power generation sources 102 and one or more bulk energy storage systems 104. Power generation sources 102 may be preferably renewable power generation sources, but may also be non-renewable power generations sources or combinations of renewable and non-renewable power generation sources. Some examples include wind generators, solar generators, geothermal generators, and nuclear generators. Bulk energy storage systems 104 may be short duration energy storage, LODES systems, or a combination of both, and may include one or more batteries. Some examples include rechargeable secondary batteries, refuellable primary batteries, and combinations of primary and secondary batteries. Battery chemistries may be any suitable chemistry, such as, but not limited to, lithium-ion based chemistries LFP, NMC, NMA, NCO, and/or Al, $AlCl_3$, Fe, $FeO_x(OH)_y$, $Na_xS_y$, $SiO_x(OH)_y$, $AlO_x(OH)_y$. Operation of power generation sources 102 may be controlled by one or more control systems 106. Control systems 106 may include motors, pumps, fans, switches, relays, or any other type devices that may serve to control the generation of electricity by power generation sources 102. Operation of bulk energy storage systems 104 may be controlled by one or more control systems 108. Control systems 108 may include motors, pumps, fans, switches, relays, or any other type devices that may serve to control the discharge and/or storage of electricity by the bulk energy storage systems. Control systems 106 and 108 may both be connected to plant controller 112. Plant controller 112 may monitor the overall operation of power generation system 101 and generate and send control signals to control systems 106 and 108 to control the operations of power generation sources 102 and bulk energy storage systems 104.

In power generation system 101, power generation sources 102 and bulk energy storage systems 104 may both be connected to one or more power control devices 110. Power control devices 110 may be connected to power grid 115 or other transmission infrastructure. Power control devices 110 may include switches, converters, inverters, relays, power electronics, and any other type devices that may serve to control the flow of electricity from, to, or between one or more of power generation sources 102, bulk energy storage systems 104, and power grid 115. Additionally, power generation system 101 may include transmission facilities 130 connecting power generation system 101 to power grid 115. As an example, transmission facilities 130 may connect between power control devices 110 and power grid 115 to enable electricity to flow between power generation system 101 and power grid 115. Transmission facilities 130 may include transmission lines, switches, relays, transformers, and any other type devices that may serve to support the flow of electricity between power generation system 101 and power grid 115. Power control devices 110 and/or transmission facilities 130 may be connected to plant controller 112. Plant controller 112 may be a computing device which may monitor and control the operations of power control devices 110 and/or transmission facilities 130, such as via various control signals. Plant controller 112 may control power control devices 110 and/or transmission facilities 130 to provide electricity from power generation sources 102 to power grid 115 and/or to bulk energy storage systems 104, to provide electricity from bulk energy storage systems 104 to power grid 115, and/or to provide electricity from power grid 115 to bulk energy storage systems 104. Power generation source 102 may selectively charge bulk energy storage system 104 and bulk energy storage system 104 may selectively discharge to the power grid 115. In this manner, energy (e.g., renewable energy, non-renewable energy, etc.) generated by power generation source 102 may be output to power grid 115 sometime after generation through bulk energy storage system 104.

Power generation sources 102 and the bulk energy storage systems 104 may be located together or geographically separated from one another. For example, bulk energy storage system 104 may be upstream of a transmission constraint, such as co-located with power generation source 102, upstream of a portion of grid 115. In this manner, over build of underutilized transmission infrastructure may be avoided by situating bulk energy storage system 104 upstream of a transmission constraint, charging bulk energy storage system 104 at times of transmission shortage and discharging bulk energy storage system 104 at times of available capacity. Bulk energy storage system 104 may also arbitrate electricity according to prevailing market prices to increase the revenues to power generation source 102. In another example, bulk energy storage system 104 may be downstream of a transmission constraint, such as downstream of a portion of grid 115, from power generation source 102. In this manner, over build of underutilized transmission infrastructure may be avoided by situating bulk energy storage system 104 downstream of a transmission constraint, charging bulk energy storage system 104 at times of available capacity and discharging bulk energy storage system 104 at times of transmission shortage. Bulk energy storage system 104 may also arbitrate electricity according to prevailing market prices to reduce the final cost of electricity to consumers.

Figure 1B:
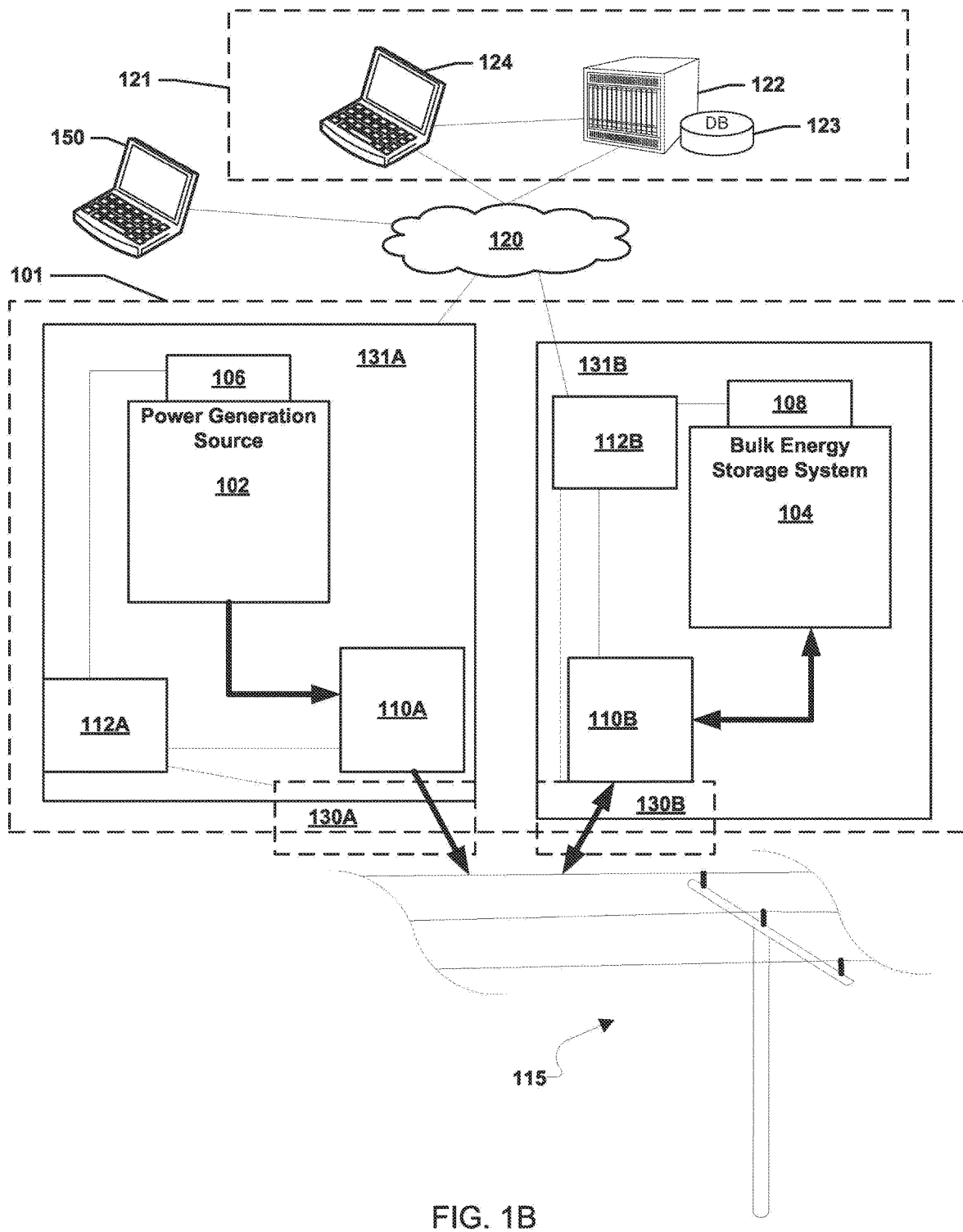
FIG. 1B is a system block diagram of an alternate combined power generation, transmission and storage system.

Referring also to FIG. 1B, in an alternate embodiment power generation sources 102 and bulk energy storage systems 104 may be separated from one another. Power generation sources 102 and bulk energy storage systems 104 may be separated in different plants 131A and 131B, respectively. Plants 131A and 131B may be co-located or may be geographically separated from one another. Plants 131A and 131B may connect to power grid 115 at different places. For example, plant 131A may connect to grid 115 upstream of where plant 131B connects. Plant 131A may include its own respective plant controller 112A, power control devices 110A, and/or transmission facilities 130A. Power control devices 110A and/or transmission facilities 130A may be connected to plant controller 112A. Plant controller 112A may monitor and control operations of power control devices 110A and/or transmission facilities 130A, such as via various control signals. Plant controller 112A may control power control devices 110A and/or transmission facilities 130A to provide electricity from power generation sources 102 to power grid 115. Plant 131B associated with bulk energy storage systems 104 may include its own respective plant controller 112B, power control devices 110B, and/or transmission facilities 130B. Power control devices 110B and/or transmission facilities 130B may be connected to plant controller 112B. Plant controller 112B may monitor and control the operations of power control devices 110B and/or transmission facilities 130B, such as via various control signals. Plant controller 112B may control the power control devices 110B and/or transmission facilities 130B to provide electricity from bulk energy storage systems 104 to power grid 115 and/or from grid 115 to bulk energy storage systems 104. Respective plant controllers 112A, 112B and respective transmission facilities 130A, 130B may be similar to plant controller 112 and transmission facilities 130 described with reference to FIG. 1A.

Figure 1C:
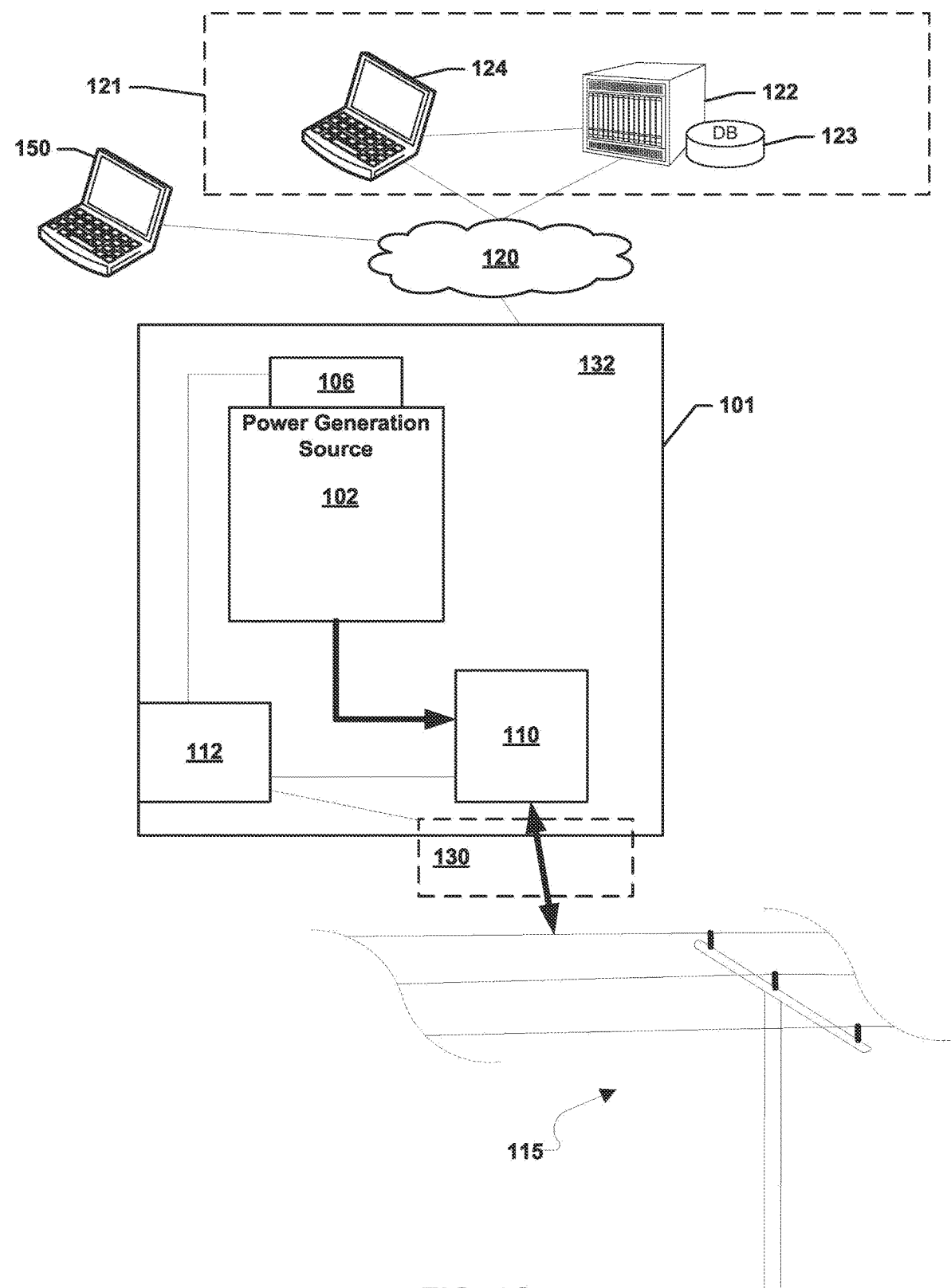
FIG. 1C is a system block diagram of an alternate power generation and transmission system.

Referring also to FIG. 1C, in an alternate embodiment power generation source 102 may be located in plant 132 that does not include a bulk energy storage system. Power generation system 101 and plant management system 121 may operate as described above with reference to FIG. 1A for monitoring and control of power generation and transmission from plant 132.

Plant controller 112, or plant controllers 112A and 112B, may be in communication with computer network 120. Using connections to network 120, plant controller 112 may exchange data with network 120 as well as devices connected to network 120, such as plant management system 121 or any other device connected to network 120. Plant management system 121 may include one or more computing devices, such as computing device 124 and server 122. Computing device 124 and server 122 may be connected to one another directly and/or via connections to network 120. The functionality of computing device 124 and server 122 may be combined into a single computing device, or may split among more than two devices. Additionally, the functionality may be in whole, or in part, offloaded to a remote computing device, such as a cloud-based computing system. While illustrated as in communication with a single power generation system 101, plant management system 121 may be in communication with multiple power generation systems.

Figure 2:
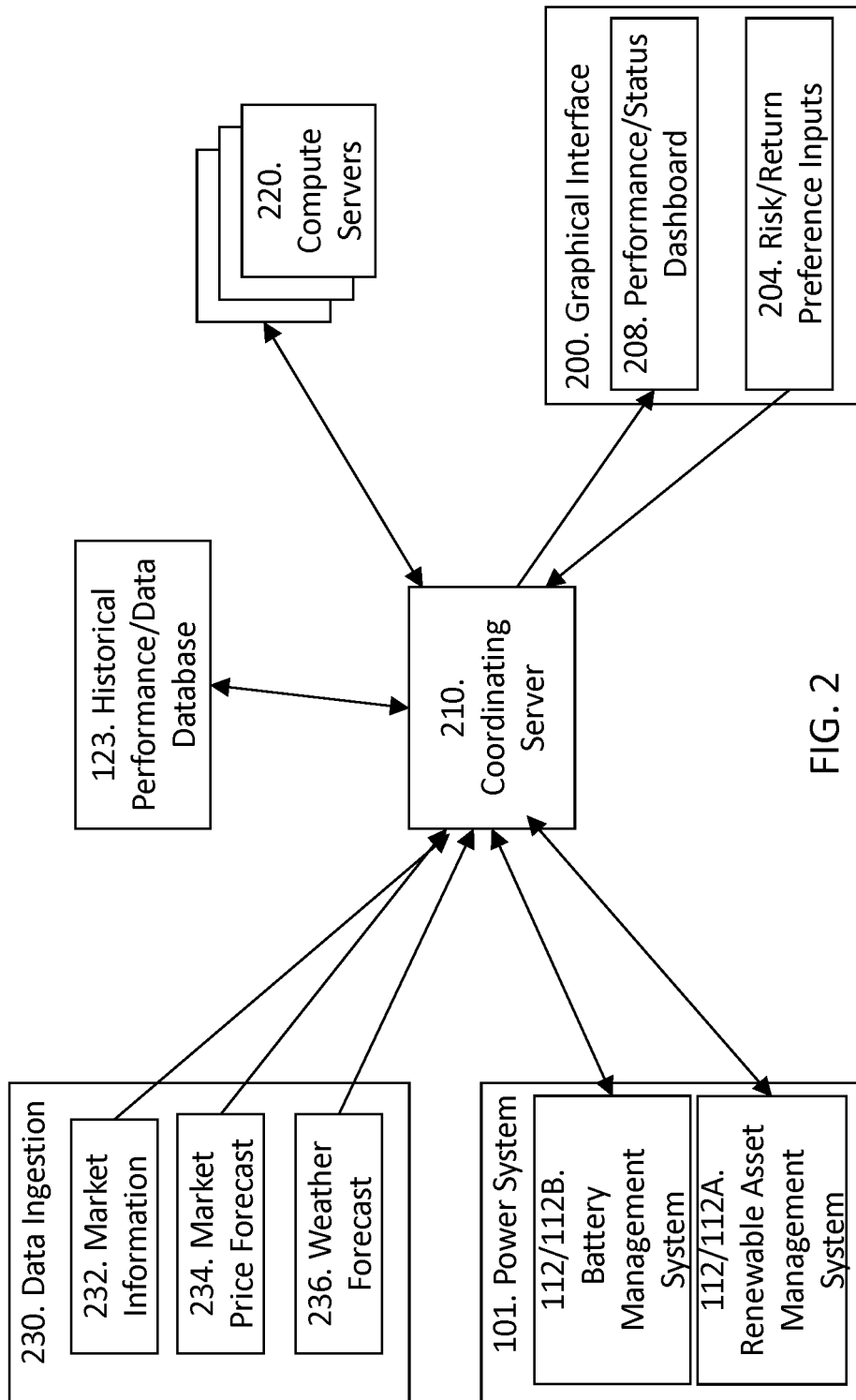
FIG. 2 is a system block diagram of computing servers and communications in a preferred embodiment.

Referring also to FIG. 2, computing device 124 of plant management system 121 may provide user interface 200 enabling a user of plant management system 121 to define inputs 204 to plant management system 121 and/or power generation system 101, receive indications 208 associated with plant management system 121 and/or power generation system 101, and otherwise control the operation of plant management system 121 and/or power generation system 101. A user may utilize computing device 124 to define one or more capability attributes, one or more operating scenarios, one or more output goals, and one or more design and operating constraints. Computing device 124 may output various determined combined power generation, transmission, and storage system design specifications, operating schedules, and power delivery strategies to a user. Server 122 may be further divided into coordinating server 210 and various compute servers 220, which may be distributed across one or multiple computing devices, or implemented within a cloud computing environment. Server 122 of plant management system 121 may be configured to perform operations to receive one or more combined power generation, transmission, and storage system capability attributes, one or more operating scenarios, one or more combined power generation, transmission, and storage system output goals, and one or more design and operating constraints and determine a combined power generation, transmission, and storage system design specification, operating schedules, and power delivery strategies based at least in part on the received one or more capability attributes, the received one or more operating scenarios, the received system one or more output goals, and the received one or more design and operating constraints. Server 122 may have access to one or more databases 123 storing data associated with historical electrical generation, power generation capabilities, electrical generation forecast data, bulk energy storage capabilities, grid capabilities, historical electricity use patterns, historical electricity pricing information, power generation profiles, market conditions, storage specifications, project constraints, or any other type information that may be suitable for use by plant management system 121. Server 122 and/or computing device 124 may receive real-time data ingest 230 streams, such as, but not limited to, current electrical generation operations, current market conditions including market information 232 and market price forecasts 234, weather forecasts 236, or any other type information that may be suitable for use by plant management system 121. Power generation system 101 may be constructed or otherwise configured based on the design specifications determined by plant management system 121. The design specifications may indicate optimized parameters for one or more of power generation source 102, bulk energy storage system 104, and/or transmission facilities 130 to which power generation system 101 may be constructed or otherwise configured. Operation of plant controller 112, or plant controllers 112A and 112B, may be monitored by plant management system 121 and the operation of plant controller 112, or plant controllers 112A and 112B, and thereby power generation system 101, may be controlled by plant management system 121.

Plant management system 121 may interface with other computing devices connected to network 120, such as computing device 150. Using connections to network 120, plant management system 121 and computing device 150 may exchange data with one another. Alternatively, or additionally, computing device 150 may also directly connect to devices of plant management system 121. Plant management system 121 may provision one or more interfaces to other computing devices, such as computing device 150, enabling the other computing devices to interact with plant management system 121. As an example, plant management system 121 may provide a market interface enabling other computing devices, such as computing device 150, to be used to buy and/or sell shortfall and/or excess power generation of power generation system 101. The buying/selling of shortfall/excess may be controlled by plant management system 121 according to a cost strategy, such as a cost minimizing strategy, or a value strategy, such as a value maximizing strategy, that may inform operation of power generation system 101, especially bulk energy storage system 104. In this manner, bulk energy storage system 104 may be operated as a hedge against volatility of market prices. In other words, the ability of a market interface to sell and/or buy power generation capability through plant management system 121 may reduce the cost of supplying a load to consumers of the power from power generation system 101 or increase the market value of the power from power generation system 101 in a manner that optimizes the risk and return profile of the power generation system owner or operator.

Figure 3:
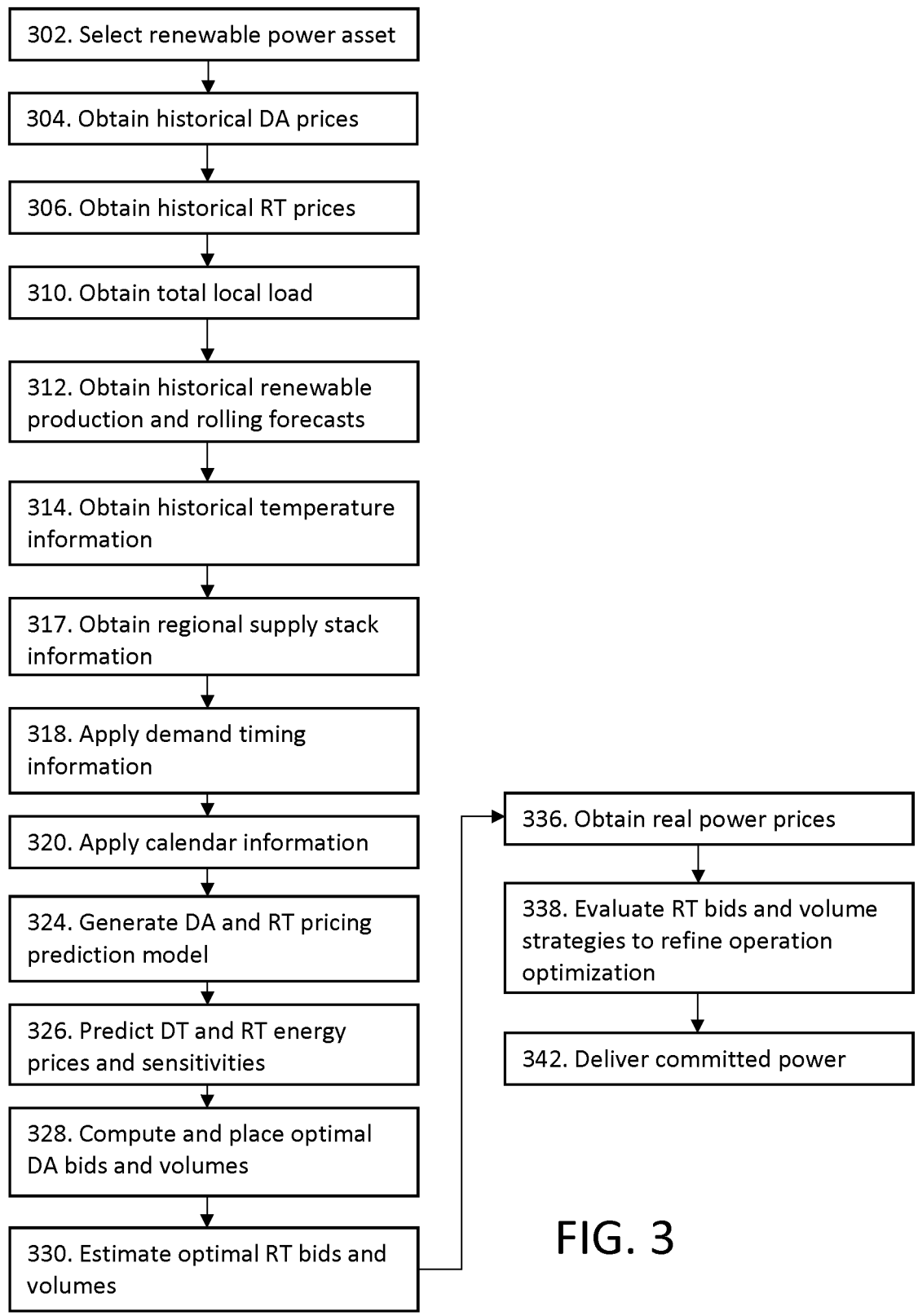
FIG. 3 is a process flow diagram illustrating an embodiment method for managing a renewable power asset according to various embodiments.

Referring also to FIG. 3, the operations of a method for managing a renewable power asset may be performed by a processor of a control device, such as one or more computer processors of plant management system 121, of plant controller 112, of any computing device in communication with plant management system 121 or plant controller 112, or any combination of multiple processors thereof. The method may be executed through software instructions executed by the processor and stored on a non-transitory processor readable or computer readable medium. Alternatively, the functional steps of the method may be implemented in hardware or firmware executed by the processor. The processor selects 302 a renewable power asset. Selection may be automated, or under control of a user through a user interface. For example, the control device may be configured to control a plurality of renewable power assets, and the processor may select a renewable power asset from among the plurality of renewable power assets for consideration.

The processor may generate forecasts of DA and RT prices via regression or other advanced prediction techniques, which are known in the art and outside the scope of this disclosure, against weather forecasts, supply and demand, nodal transmission characteristics, as well as indicators of market sentiment. The processor may obtain data pertaining to the node being inspected including, but not limited to, historical DA and RT prices, total quantities committed at day ahead planning and total local load, historical renewable generation and day-ahead estimated renewable generation with associated exceedance probabilities, historical temperature, and plant outages. The processor may generate auxiliary signals such as, but not limited to, on/off peak, weekday/weekend binary signals, and season or month categorical signals. The processor may use all or a subset of the data and generate a mathematical model (such as an autoregressive-moving-average model with exogenous inputs, ARMAX, a feed-forward neural network, a recurring neural network, or similar advanced regression models known to those skilled in the art) to predict the DA and/or RT pricing for multiple prediction horizons. Historical trends of sensitivity to different processes can be extrapolated into the future to generate multiple future scenarios with corresponding probabilistic weighing. The processor may augment the DA and RT pricing information with a fundamental model based on the supply stack in the region for additional fidelity. For example, DA price forecasts can be calculated emulating the methodology by which generation assets are committed to supply electricity, including the solution of linear and mixed-integer linear problems with a cost minimization target. The processor may apply statistical descriptions of the model residuals to add stochastic information back on the model output to accurately simulate data with properties which resemble the true signal across a number of possible future scenarios.

After selection of the renewable power asset, the processor may obtain 304 historical DA prices for energy provided from the renewable power asset. The processor may obtain all historical DA prices, or from a date and/or time range of historical DA prices. The processor may obtain 306 historical RT prices for energy provided from the renewable power asset. The processor may obtain all historical RT prices, or from a date and/or time range of historical RT prices. The processor may obtain a total of DA committed energy quantities from the renewable power asset. For example, the processor may obtain total quantities committed at DA scheduling for the renewable power asset. The processor may obtain 310 a total local load related to the renewable power asset. The processor may obtain 312 historical renewable generation information and rolling forecasts related to the renewable power asset, DA estimated renewable generation information related to the renewable power asset, and associated exceedance probabilities. The processor may obtain all historical information, or from a date and/or time range of historical information. The processor may obtain 314 historical temperature information and historical weather information related to the renewable power asset. The processor may obtain all historical temperature information, or from a date and/or time range of historical temperature information. The processor may obtain historical renewable power asset outage information for the renewable power asset. For example, the processor may obtain a date, time, season, length of outage, cause of outage, and other information related to historical renewable power asset outage events. The processor may obtain 317 information related to the regional supply stack. For example, power generation resources, including the renewable power asset, may be capable of providing a particular quantity of energy. Further, the power generation resources, including the renewable power asset, may be capable of providing the energy at a particular supply price (i.e., a supply offer). The processor may obtain from the network a supply stack including supply offers from a plurality of power generation resources. The supply stack may provide an indication of a regional cost of supplying demand for electricity. The processor may obtain 318 demand timing information for power demand toward which the renewable power asset may contribute. For example, the processor may obtain timing information such as on peak, off peak, or another demand level; demand timing according to date of week, weekday, weekend, and the like. The processor may obtain 320 calendar information, such as power demand timing based on date, month, season, and the like; and other suitable timing information.

The processor may generate 324 a pricing prediction model for DA pricing and/or RT pricing for the renewable power asset. The pricing prediction model may be based on one or more of the historical DA and RT prices of energy, the total local load, the historical renewable generation information and the DA estimated renewable generation information and associated exceedance probabilities, the historical temperature information, the historical outage information, demand timing information, the calendar information, and the regional supply stack information. The generated pricing prediction model may include an ARMAX model, a feedforward neural network model, a recurring neural network model, or similar advanced regression models known to those skilled in the art. Based on the wide array of data inputs, the processor may generate the pricing prediction model and extrapolate historical trends of sensitivity to different processes into the future, thereby generating forward-looking scenarios with corresponding probabilistic weighing. The processor may augment the DA and RT pricing information with a fundamental model based on the supply stack in the region for additional fidelity. For example, DA prices may be calculated emulating the methodology by which generation assets are committed to supply electricity, including the solution of linear and mixed-integer linear problems with a cost minimization target. The processor may apply statistical descriptions of the model residuals to add stochastic information back on the model output to accurately simulate data with properties which resemble the true signal across a number of possible future scenarios. The processor may determine 326 a prediction of DA energy prices and RT energy prices and sensitivities, meaning variations of possible scenarios, for the renewable power asset based on the generated pricing prediction model.

The processor may compute 328 and place, through a market interface, optimal DA commitments for the renewable power asset, and for energy from any available energy storage system. For example, the processor may, in a first pass, use the forecasts of the DA and RT prices to identify the optimal day ahead commitments of the renewable power asset across a range of scenarios weighted by probability estimating. Equation 1 is a representative value maximizing mathematical formulation for the determination of optimal DA commitments and expected optimal power curtailment of a renewable power asset without any associated energy storage system.

$$\max_{q_{DA}, q_X} \left\{ \sum_{\substack{1 \le n \le N \\ 1 \le m \le M \\ 1 \le k \le K}} w_{n,m,k} \gamma_m \left( q_{DA}^T \cdot p_{DA,n} + (q_{RT,m} - q_{DA} - q_X)^T \cdot p_{RT,k} - \delta_{RT,n,m,k} \right) \right\} \quad \text{Equation 1}$$

The risk bias factor $\beta_m$ enables a user to weigh more heavily a specific renewable generation scenario so as to reflect asset owner risk preferences. For example, a conservative asset owner may want to weigh more heavily a conservative estimate of renewable power output.

Equation 2 is a representative mathematical formulation that uses a balanced combination of mean and variance for the determination of optimal DA commitments and expected optimal power curtailment of a renewable power asset without any associated energy storage system.

$$\max_{q_{DA}, q_X} \left\{ \mu_\alpha - \lambda \left( \sum_{\substack{1 \le n \le N \\ 1 \le m \le M \\ 1 \le k \le K}} w_{n,m,k} \gamma_m (\alpha_{n,m,k})^2 - \mu_\alpha^2 \right) \right\} \quad \text{Equation 2}$$

Where:

$$\mu_\alpha \stackrel{def}{=} \sum_{\substack{1 \le n \le N \\ 1 \le m \le M \\ 1 \le k \le K}} w_{n,m,k} \gamma_m \alpha_{n,m,k}$$

$$\alpha_{n,m,k} \stackrel{def}{=} q_{DA}^T \cdot p_{DA,n} + (q_{RT,m} - q_{DA} - q_X)^T \cdot p_{RT,k} - \delta_{RT,n,m,k}$$

An alternative formulation for the determination of optimal DA commitments and expected optimal power curtailment of a renewable power asset without any associated energy storage system, which is suited for a linear programming framework with LP computable utility functions, may ignore penalties:

$$\alpha_{n,m,k} = q_{DA}^T \cdot p_{DA,n} + (q_{RT,m} - q_{DA} - q_X)^T \cdot p_{RT,k} = q_{DA}^T \cdot (p_{DA,n} - p_{RT,k}) - q_X^T \cdot p_{RT,k} + q_{RT,m}^T \cdot p_{RT,k} \quad \text{Equation 3}$$

Introduce the auxiliary optimization variable $$x \stackrel{def}{=} \begin{bmatrix} q_{DA} \\ q_X \\ x_{2J+1} \end{bmatrix}$$

and the unit returns $$r_{n,k} \stackrel{def}{=} \begin{bmatrix} p_{DA,n} - p_{RT,k} \\ -p_{RT,k} \\ q_{RT,m}T \cdot p_{RT,k} \end{bmatrix} \quad \text{Equation 4}$$

$$\alpha_{n,m,k} = x^T \cdot r_{n,k} + q_{RT,m}T \cdot p_{RT,k}$$

Index scenarios to t and expand to components of x, $r_t$:

$$\alpha_t = x^T \cdot r_t = \sum_{1 \le j \le 2J+1} x_j r_{j,t}; x_{2J+1} = 1 \quad \text{Equation 5}$$

Introduce average return at given time step (average across scenarios):

$$\mu_j \stackrel{def}{=} \sum_{1 \le t \le T} w_t r_{j,t} \quad \text{Equation 6}$$

Different optimizations may be applied to solve the optimal DA commitments, based on the LP goal expressed in Equation 7.

$$\max_x \{\mu(x) - \lambda \rho(x)\}, \rho(x) \stackrel{def}{=} \text{Dispersion} \quad \text{Equation 7}$$

Equation 8 applies a mean absolute deviation (MAD), Equation 9 applies a minimax, Equation 10 applies a conditional value at risk (CVaR), Equation 11 applies a Gini mean difference (GMD), and Equation 12 applies a weighted conditional value at risk (WCVaR).

$$\max_{x,d^-} \left\{ \sum_j x_j \mu_j - \lambda \left( \sum_t d_t^- w_t \right) : d_t^- \ge \sum_j (\mu_j - r_{j,t}) x_j; d_t^- \ge 0; \forall t = 1 \ldots T \right\} \quad \text{Equation 8}$$

$$\max_{x,v} \left\{ \sum_j x_j \mu_j - \lambda v : v \ge \sum_j (\mu_j - r_{j,t}) x_j; \forall t = 1 \ldots T \right\} \quad \text{Equation 9}$$

$$\max_{x,d^-,\eta} \left\{ \begin{array}{l} \sum_j x_j \mu_j - \lambda \left( \sum_j x_j \mu_j - \eta + \frac{1}{\beta} \sum_t d_t^- w_t \right) : \\ d_t^- \ge \eta - \sum_j r_{j,t} x_j; d_t^- \ge 0; \forall t = 1 \ldots T \end{array} \right\} \quad \text{Equation 10}$$

$\eta \stackrel{def}{=}$ VaR at optimum; $\beta \stackrel{def}{=}$ probability of returns ≤ VaR, $0 < \beta \le 1$ $$\max_{x,u} \left\{ \begin{array}{l} \sum_j x_j \mu_j - \lambda \left( \sum_j x_j \mu_j - \sum_{t,j} r_{j,t} x_j w_t^2 - 2 \sum_{\substack{1 \le t' \le T-1 \\ t'+1 \le t'' \le T}} u_{t',t''} w_{t'} w_{t''} \right) : \\ u_{t',t''} \le \sum_j r_{j,t'} x_j; u_{t',t''} \le \sum_j r_{j,t''} x_j; \forall t' = 1 \ldots T-1; t'' = t'+1 \ldots T \end{array} \right\} \quad \text{Equation 11}$$

$$\max_{x,d^-,\eta} \left\{ \begin{array}{l} \sum_h \omega_h \left( \sum_j x_j \mu_j - \lambda \left( \sum_j x_j \mu_j - \eta_h + \frac{1}{\beta_h} \sum_t d_{h,t}^- w_t \right) \right) : \\ d_{h,t}^- \ge \eta_h - \sum_j r_{j,t} x_j; d_{h,t}^- \ge 0; \forall t = 1 \ldots T; \omega_h \in \text{weights} \end{array} \right\} \quad \text{Equation 12}$$

Alternatively, the optimization may be subject to a minimum return constraint as specified in Equation 13. Again, different optimizations may be applied, such as MAD (Equation 14), minimax (Equation 15), CVaR (Equation 16), GMD (Equation 17), or WCVaR (Equation 18).

$$\max_x \{\mu(x) - \rho(x) : \mu(x) \ge \mu_0\} \quad \text{Equation 13}$$

$$\max_{x,d^-} \left\{ \sum_j x_j \mu_j - \sum_t d_t^- w_t : d_t^- \ge \sum_j (\mu_j - r_{j,t}) x_j; d_t^- \ge 0; \forall t = 1 \ldots T; \sum_j x_j \mu_j \ge \mu_0 \right\} \quad \text{Equation 14}$$

$$\max_{x,v} \left\{ \sum_j x_j \mu_j - v : v \ge \sum_j (\mu_j - r_{j,t}) x_j; \forall t = 1 \ldots T; \sum_j x_j \mu_j \ge \mu_0 \right\} \quad \text{Equation 15}$$

-continued $$\max_{x,d^-,\eta}\left\{\eta - \frac{1}{\beta}\sum_t d_t^- w_t : d_t^- \geq \eta - \sum_j r_{j,t} x_j; d_t^- \geq 0; \forall\, t = 1 \ldots T; \sum_j x_j \mu_j \geq \mu_0\right\} \quad \text{Equation 16}$$

$$\max_{x,u}\left\{\begin{array}{c}\left(\sum_{t,j} r_{j,t} x_j w_t^2 + 2 \sum_{\substack{1 \leq t' \leq T-1 \\ t'+1 \leq t'' \leq T}} u_{t',t''} w_{t'} w_{t''}\right): \\ u_{t',t''} \leq \sum_j r_{j,t'} x_j; u_{t',t''} \leq \sum_j r_{j,t''} x_j; \forall\, t' = 1 \ldots T-1; t'' = t'+1 \ldots T; \sum_j x_j \mu_j \geq \mu_0\end{array}\right\} \quad \text{Equation 17}$$

$$\max_{x,d^-}\left\{\begin{array}{c}\sum_h \omega_h \left(\eta_h - \frac{1}{\beta_h} \sum_t d_{h,t}^- w_t\right): \\ d_{h,t}^- \geq \eta_h - \sum_j r_{j,t} x_j; d_{h,t}^- \geq 0; \forall\, t = 1 \ldots T; \omega_h \in \text{weights}; \sum_j x_j \mu_j \geq \mu_0\end{array}\right\} \quad \text{Equation 18}$$

As another alternative, optimizations may be based on minimizing dispersion while subject to a minimum return constraint as specified in Equation 19. Again, different optimizations may be applied, such as MAD (Equation 20), minimax (Equation 21), CVaR (Equation 22), GMD (Equation 23), or WCVaR (Equation 24).

$$\min_x \{\rho(x) : \mu(x) \geq \mu_0\} \quad \text{Equation 19}$$

$$\min_{x,d^-}\left\{\sum_t d_t^- w_t : d_t^- \geq \sum_j (\mu_j - r_{j,t}) x_j; d_t^- \geq 0; \forall\, t = 1 \ldots T; \sum_j x_j \mu_j \geq \mu_0\right\} \quad \text{Equation 20}$$

$$\min_{x,v}\left\{v : v \geq \sum_j (\mu_j - r_{j,t}) x_j; \forall\, t = 1 \ldots T; \sum_j x_j \mu_j \geq \mu_0\right\} \quad \text{Equation 21}$$

$$\max_{x,d^-,\eta}\left\{\begin{array}{c}\sum_j x_j \mu_j - \eta + \frac{1}{\beta}\sum_t d_t^- w_t : \\ d_t^- \geq \eta - \sum_j r_{j,t} x_j; d_t^- \geq 0; \forall\, t = 1 \ldots T; \sum_j x_j \mu_j \geq \mu_0\end{array}\right\} \quad \text{Equation 22}$$

$$\max_{x,u}\left\{\begin{array}{c}\left(\sum_j x_j \mu_j - \sum_{t,j} r_{j,t} x_j w_t^2 - 2 \sum_{\substack{1 \leq t' \leq T-1 \\ t'+1 \leq t'' \leq T}} u_{t',t''} w_{t'} w_{t''}\right): \\ u_{t',t''} \leq \sum_j r_{j,t'} x_j; u_{t',t''} \leq \sum_j r_{j,t''} x_j; \forall\, t' = 1 \ldots T-1; t'' = t'+1 \ldots T; \sum_j x_j \mu_j \geq \mu_0\end{array}\right\} \quad \text{Equation 23}$$

$$\max_{x,d^-}\left\{\begin{array}{c}\sum_j x_j \mu_j - \sum_h \omega_h \left(\eta_h - \frac{1}{\beta_h} \sum_t d_{h,t}^- w_t\right): \\ d_{h,t}^- \geq \eta_h - \sum_j r_{j,t} x_j; d_{h,t}^- \geq 0; \forall\, t = 1 \ldots T; \omega_h \in \text{weights}; \sum_j x_j \mu_j \geq \mu_0\end{array}\right\} \quad \text{Equation 24}$$

As another alternative, optimizations may be based relative to a no risk scenario as specified in Equation 25. Again, different optimizations may be applied, such as MAD (Equation 26), minimax (Equation 27), or CVaR (Equation 28).

$$\max_x \{(\mu(x) - r_0)/\rho(x)\}, r_0 \stackrel{def}{=} \text{risk free return} \quad \text{Equation 25}$$

$$\max_{\tilde{x},\tilde{d}^-,z}\left\{\begin{array}{c}\sum_j \tilde{x}_j \mu_j - r_0 z : \sum_t \tilde{d}_t^- w_t = z; \tilde{d}_t^- \geq \sum_j (\mu_j - r_{j,t}) \tilde{x}_j; \\ \tilde{d}_t^- \geq 0; \forall\, t = 1 \ldots T; \sum_j \tilde{x}_j = z; \tilde{x}_j \geq 0\end{array}\right\} \Rightarrow x = \tilde{x}/z \quad \text{Equation 26}$$

$$\max_{\tilde{x},\tilde{v}}\left\{\begin{array}{c}\sum_j \tilde{x}_j \mu_j - r_0 z : \\ \tilde{v} = z; \tilde{v} \geq \sum_j (\mu_j - r_{j,t}) \tilde{x}_j; \forall\, t = 1 \ldots T; \sum_j \tilde{x}_j = z; \tilde{x}_j \geq 0\end{array}\right\} \Rightarrow x = \tilde{x}/z \quad \text{Equation 27}$$

-continued $$\max_{\tilde{x},\tilde{d}^-,z,\eta} \left\{ \begin{array}{l} \sum_j \tilde{x}_j \mu_j - r_0 z : \sum_j \tilde{x}_j \mu_j - \eta + \dfrac{1}{\beta} \sum_t \tilde{d}_t^- w_t = z; \\ \tilde{d}_t^- \geq \eta - \sum_j r_{j,t} \tilde{x}_j; \tilde{d}_t^- \geq 0; \forall\, t = 1\,\ldots\, T; \sum_j \tilde{x}_j = z; \tilde{x}_j \geq 0 \end{array} \right\} \Rightarrow x = \tilde{x}/z$$

Equation 28

As another example, the processor may, in a first pass, use the forecasts of DA and RT prices to identify the optimal day ahead commitments of the renewable generator and a power storage asset. Optimal DA commitments, expected renewable curtailment and energy storage configuration and dispatch strategy of a renewable and storage asset may be determined based on Equation 29, subject to storage system discharge, charge, and state of charge constraints.

$$\max_{q_{DA}, q_X, d_{RT}, c_{RT}, P_{ESS}, E_{ESS}}$$

$$\left\{ \sum_{\substack{1 \leq n \leq N \\ 1 \leq m \leq M \\ 1 \leq k \leq K}} w_{n,m,k} \gamma_m \big( q_{DA}^T \cdot p_{DA,n} + (q_{RT,m} + d_{RT} - c_{RT} - q_{DA} - q_X)^T \cdot p_{RT,k} - \delta_{RT,n,m,k} - c_P P_{ESS} - c_E E_{ESS} \big) \right\}$$

where $$d_{RT,j} \leq P_{ESS} \forall\, j \qquad \text{Equation 29}$$

$$c_{RT,j} \leq P_{ESS} \forall\, j$$

$$SOC_{j+1} = SOC_j - \dfrac{d_{RT,j}}{\eta_d} + \eta_c c_{RT,j} \forall\, j$$

$$0 \leq SOC_{j+1} \leq E_{ESS} \forall\, j$$

$$\eta_d \stackrel{def}{=} \text{Discharge efficiency}$$

$$\eta_c \stackrel{def}{=} \text{Charge efficiency}$$

Alternatively, as shown in Equation 30, a balanced combination of mean and variance may be used for the determination of optimal DA commitments, expected optimal renewable curtailment and energy storage configuration and dispatch strategy of a renewable and storage asset.

$$\max_{q_{DA},q_X,d_{RT},c_{RT},P_{ESS},E_{ESS}} \left\{ \mu_\vartheta - \lambda \left( \sum_{\substack{1 \leq n \leq N \\ 1 \leq m \leq M \\ 1 \leq k \leq K}} w_{n,m,k} \gamma_m (\vartheta_{n,m,k})^2 - \mu_\vartheta^2 \right) \right\}$$

Equation 30 where:

$$\mu_\vartheta \stackrel{def}{=} \sum_{\substack{1 \leq n \leq N \\ 1 \leq m \leq M \\ 1 \leq k \leq K}} w_{n,m,k} \gamma_m \vartheta_{n,m,k}$$

$$\vartheta_{n,m,k} \stackrel{def}{=}$$

$$q_{DA}^T \cdot p_{DA,n} + (q_{RT,m} + d_{RT} - c_{RT} - q_{DA} - q_X)^T \cdot p_{RT,k} -$$

$$\delta_{RT,n,m,k} - c_P P_{ESS} - c_E E_{ESS}$$

Another alternative formulation for the determination of optimal DA commitments, expected optimal renewable curtailment and energy storage configuration and dispatch strategy of a renewable and storage asset, which is suited for a linear programming framework with LP computable utility functions may ignore penalties:

$$\vartheta_{n,m,k} = q_{DA}^T \cdot p_{DA,n} + (q_{RT,m} + d_{RT} - c_{RT} - q_{DA} - q_X)^T \cdot p_{RT,k} - c_P P_{ESS} - c_E E_{ESS} = q_{DA}^T \cdot (p_{DA,n} - p_{RT,k}) + d_{RT}^T \cdot p_{RT,k} - c_{RT}^T \cdot p_{RT,k} - q_X^T \cdot p_{RT,k} + q_{RT,m}^T \cdot p_{RT,k} - c_P P_{ESS} - c_E E_{ESS}$$

Equation 31

Introduce the auxiliary optimization variable $$x \stackrel{def}{=} \begin{bmatrix} q_{DA} \\ q_X \\ d_{RT} \\ c_{RT} \\ P_{ESS} \\ E_{ESS} \\ x_{4J+3} \end{bmatrix}$$

and the unit returns $$r_{n,m,k} \stackrel{def}{=} \begin{bmatrix} p_{DA,n} - p_{RT,k} \\ -p_{RT,k} \\ p_{RT,k} \\ -p_{RT,k} \\ -c_P \\ -c_E \\ q_{RT,m}^T \cdot p_{RT,k} \end{bmatrix}$$

Equation 32

$$\vartheta_{n,m,k} = x^T \cdot r_{n,m,k}; x_{4J+3} = 1$$

Index scenarios to t and expand to components of x, $r_t$:

$$\vartheta_t = x^T \cdot r_t = \sum_{1 \leq j \leq 4J+3} x_j r_{j,t}; x_{4J+3} = 1$$

Equation 33

Introduce average return at given time step (average across scenarios):

$$\mu_j \stackrel{def}{=} \sum_{1 \leq t \leq T} w_t r_{j,t}$$

Equation 34

With this formulation, the same MAD, minimax, CVaR, GMD, or WCVaR optimizations may be applied to the maximization or minimization goals and constraints as in Equations 7-28. As it will be apparent to those skilled in the art, the optimizations in Equations 29-34 may be directed to calculating the expected optimal renewable curtailment and energy storage dispatch strategy of a renewable and storage asset, but not the energy storage optimal configuration, by defining energy storage rated power $P_{ESS}$ and energy storage rated energy $E_{ESS}$ as constant and equal to the rated power and energy of a physical energy storage system.

With optimal DA commitments identified, the processor may estimate 330 an optimal RT schedule for the renewable power asset. For example, in a second pass, with the optimal day ahead commitments as fixed and the DA prices known, the processor may use the RT forecasts (e.g., with a rolling horizon) to estimate an optimal RT schedule across a range of scenarios that may be weighted by their probability. The optimal RT schedule identifies RT bids and volumes for generation. Equation 35 is a value maximizing mathematical formulation for the determination of optimal RT power curtailment of a renewable power asset without associated energy storage.

$$\max_{q_X}\left\{\sum_{\substack{0\le m\le M \\ 0\le k\le K}} \widetilde{w_{m,k}}\gamma_m\big((q_{RT,m}-q_{DA}-q_X)^T\cdot p_{RT,k}-\delta_{RT,m,k}\big)\right\} \quad\text{Equation 35}$$

Alternatively, as shown in Equation 36, a balanced combination of mean and variance may be used for the determination of optimal RT power curtailment of a renewable power asset without associated energy storage.

$$\max_{q_X}\left\{\mu_{\tilde\alpha}-\lambda\left(\sum_{\substack{0\le m\le M \\ 0\le k\le K}}\widetilde{w_{m,k}}\gamma_m(\widetilde{\rho_{m,k}})^2-\mu_{\tilde\alpha}^2\right)\right\}$$

where:

$$\mu_{\tilde\alpha}\stackrel{def}{=}\sum_{\substack{0\le m\le M \\ 0\le k\le K}}\widetilde{w_{m,k}}\gamma_m\widetilde{\alpha_{m,k}} \quad\text{Equation 36}$$

$$\widetilde{\alpha_{m,k}}\stackrel{def}{=}(q_{RT,m}-q_{DA}-q_X)^T\cdot p_{RT,k}-\delta_{RT,m,k}$$

Another alternative formulation for the determination of optimal RT power curtailment of a renewable power asset without associated energy storage, which is suited for a linear programming framework with LP computable utility functions may ignore penalties:

$$\widetilde{\alpha_{m,k}}=(q_{RT,m}-q_{DA}-q_X)^T\cdot p_{RT,k}=-q_X^T\cdot p_{RT,k}+(q_{RT,m}-q_{DA})^T\cdot p_{RT,k} \quad\text{Equation 37}$$

Introduce the auxiliary optimization variable $$x\stackrel{def}{=}\begin{bmatrix} q_X \\ x_{J+1}\end{bmatrix}$$

and the unit returns $$r_k\stackrel{def}{=}\begin{bmatrix}-p_{RT,k} \\ (q_{RT,m}-q_{DA})^T\cdot p_{RT,k}\end{bmatrix} \quad\text{Equation 38}$$

$$\widetilde{\alpha_{m,k}}=x^T\cdot r_{m,k};\, x_{J+1}=1$$

Index scenarios to t and expand to components of x, $r_t$:

$$\widetilde{\alpha_t}=x^T\cdot r_t=\sum_{1\le j\le J+1}x_j r_{j,t};\, x_{J+1}=1 \quad\text{Equation 39}$$

Introduce average return at given time step (average across scenarios):

$$\mu_j\stackrel{def}{=}\sum_{1\le t\le T}w_t r_{j,t} \quad\text{Equation 40}$$

With this formulation, the same MAD, minimax, CVaR, GMD, or WCVaR optimizations may be applied to the maximization or minimization goals and constraints as in Equations 7-28.

As another example, the processor may estimate an optimal RT schedule for the renewable generator and energy storage asset(s). For example, in a second pass, with the optimal day ahead commitments as fixed and the DA prices known, the processor may use the RT forecasts (e.g., with a rolling horizon) to estimate optimal RT schedule across a range of scenarios that may be weighted by their probability. Here, the optimal RT schedule identifies RT bids and volumes for generation, as well as RT bids and volumes for charging or discharging from any energy storage assets. Equation 41 is a value maximizing mathematical formulation for the determination of optimal RT power curtailment and energy storage configuration and dispatch strategy of a renewable and storage asset, subject to storage system discharge, charge, and state of charge constraints.

$$\max_{q_X,d_{RT},c_{RT},P_{ESS},E_{ESS}}\left\{\sum_{\substack{0\le m\le M \\ 0\le k\le K}}\widetilde{w_{m,k}}\gamma_m\big((q_{RT,m}+d_{RT}-c_{RT}-q_{DA}-q_X)^T\cdot p_{RT,k}-\delta_{RT,m,k}-c_P P_{ESS}-c_E E_{ESS}\big)\right\}$$

where:

$$d_{RT,j}\le P_{ESS}\forall\, j \quad\text{Equation 41}$$

$$c_{RT,j}\le P_{ESS}\forall\, j$$

$$SOC_{j+1}=SOC_j-\frac{d_{RT,j}}{\eta_d}+\eta_c c_{RT,j}\forall\, j$$

$$0\le SOC_{j+1}\le E_{ESS}\forall\, j$$

$$\eta_d\stackrel{def}{=}\text{Discharge efficiency}$$

$$\eta_c\stackrel{def}{=}\text{Charge efficiency}$$

Alternatively, as shown in Equation 42, a balanced combination of mean and variance may be used for the determination of optimal RT power curtailment and energy storage configuration and dispatch strategy of a renewable and storage asset.

$$\max_{q_X,d_{RT},c_{RT},P_{ESS},E_{ESS}}\left\{\mu_{\tilde\vartheta}-\lambda\left(\sum_{\substack{0\le m\le M \\ 0\le k\le K}}\widetilde{w_{m,k}}\gamma_m(\widetilde{\vartheta_{m,k}})^2-\mu_{\tilde\vartheta}^2\right)\right\}$$

where:

$$\mu_{\tilde\vartheta}\stackrel{def}{=}\sum_{\substack{0\le m\le M \\ 0\le k\le K}}\widetilde{w_{m,k}}\gamma_m\widetilde{\vartheta_{m,k}} \quad\text{Equation 42}$$

$$\widetilde{\vartheta_{m,k}}\stackrel{def}{=}(q_{RT,m}+d_{RT}-c_{RT}-q_{DA}-q_X)^T\cdot p_{RT,k}-\delta_{RT,m,k}-c_P P_{ESS}-c_E E_{ESS}$$

Another alternative formulation for the determination of optimal RT power curtailment of a renewable power asset and energy storage configuration and dispatch, which is suited for a linear programming framework with LP computable utility functions may ignore penalties:

$$\widetilde{\vartheta}_{m,k} = (q_{RT,m} + d_{RT} - c_{RT} - q_{DA} - q_X)^T \cdot p_{RT,k} - c_P P_{ESS} - c_E E_{ESS} = d_{RT}^T \cdot p_{RT,k} - c_{RT}^T \cdot p_{RT,k} - q_X^T \cdot p_{RT,k} + (q_{RT,m} - q_{DA})^T \cdot p_{RT,k} - c_P P_{ESS} - c_E E_{ESS}$$ Equation 43

Introduce the auxiliary optimization variable $$x \stackrel{def}{=} \begin{bmatrix} q_X \\ d_{RT} \\ c_{RT} \\ P_{ESS} \\ E_{ESS} \\ x_{3J+3} \end{bmatrix}$$

and the unit returns $$r_k \stackrel{def}{=} \begin{bmatrix} -p_{RT,k} \\ p_{RT,k} \\ -p_{RT,k} \\ -c_P \\ -c_E \\ (q_{RT,m} - q_{DA})^T \cdot p_{RT,k} \end{bmatrix}$$

$$\widetilde{\vartheta}_{m,k} = x^T \cdot r_{m,k}; x_{3J+3} = 1$$ Equation 44

Index scenarios to t and expand to components of x, $r_t$:

$$\widetilde{\vartheta}_t = x^T \cdot r_t = \sum_{1 \le j \le 3J+3} x_j r_{j,t}; x_{3J+3} = 1$$ Equation 45

Introduce average return at given time step (average across scenarios):

$$\mu_j \stackrel{def}{=} \sum_{1 \le t \le T} w_t r_{j,t}$$ Equation 46

With this formulation, the same MAD, minimax, CVaR, GMD, or WCVaR optimizations may be applied to the maximization or minimization goals and constraints as in Equations 7-28. As it will be apparent to those skilled in the art, the optimizations in Equations 41-46 may be directed to calculating the expected optimal renewable curtailment and energy storage dispatch strategy of a renewable and storage asset, but not the energy storage optimal configuration, by defining energy storage rated power $P_{ESS}$ and energy storage rated energy $E_{ESS}$ as constant and equal to the rated power and energy of a physical energy storage system.

As another example, the processor may determine optimal RT renewable curtailment and of energy storage and other generation assets dispatch strategy through cost minimization as shown in Equation 47, subject to storage system discharge, charge, and state of charge constraints.

$$\min_{q_X, d_{RT}, c_{RT}} \left\{ \sum_{\substack{0 \le i \le I \\ 0 \le m \le M}} w_{i,m} \gamma_m \big( (l_{RT,i} - q_{RT,m} - d_{RT} + c_{RT} + q_X)^T \cdot c_{RT,i,m} \big) \right\}$$

where:

$$d_{RT,j} \le P_{ESS} \forall j$$ Equation 47

$$c_{RT,j} \le P_{ESS} \forall j$$

$$SOC_{j+1} = SOC_j - \frac{d_{RT,j}}{\eta_d} + \eta_c c_{RT,j} \forall j$$

$$0 \le SOC_{j+1} \le E_{ESS} \forall j$$

$$\eta_d \stackrel{def}{=} \text{Discharge efficiency}$$

$$\eta_c \stackrel{def}{=} \text{Charge efficiency}$$

Equations 1-47 present examples of optimization frameworks which may be implemented in software for operation by the processor and may be solved through known linear and non-linear mathematical programming techniques.

The processor may leverage mathematical methods (e.g. mean-variance optimization) to compute the optimal DA and RT strategy that reflects the preferences of the asset owner of risk-adjusted return. The RT strategy may deliver a renewable RT schedule and incurring penalties at times when RT schedule is short of the DA commitments. The RT strategy may buy power from RT markets to fill DA commitments at times when RT schedule is short of such commitments.

With optimal DA and RT strategy determined, the processor may obtain 336 real power prices from the communication network. For example, the processor may obtain the real power prices from another network element, such as a network element associated with one or more energy pricing markets. The processor may evaluate 338 the RT bids and volume strategy to refine the optimization operations based on the obtained real power prices. For example, the processor may evaluate optimal DA and RT strategy against a back-test of real prices to refine the optimal operation further, for example by training a neural network to minimize the error between the optimal DA and RT strategy based on DA and RT price forecasts and the optimal DA and RT strategy based on DA and RT realized prices and applying the network itself to correct for future optimal DA and RT strategy. With the strategy refined based on RT pricing, the processor may participate in a Real Time energy market and deliver volumes of energy based on the RT price as determined by the RT strategy. The processor may control the renewable power asset and any associated energy storage to deliver 342 committed power based on any existing DA commitments and the refined RT delivery strategy.

The various optimization frameworks detailed above may be implemented individually for a specific system and owner. For example, a specific long-term expected profit maximization optimization may be selected and implemented in software for an owner or operator of a renewable generation asset with no related storage in a deregulated Day Ahead/Real Time energy market. A different cost minimization optimization may be implemented in software for an owner or operator of a renewable generation asset with storage in a regulated environment. Thus the software, and operation of the processor, may be customized to each system, owner, and owner preferences. Alternatively, multiple optimization frameworks may be implemented in software. Owner or operator selection between different optimizations may be in advance through a user interface selection or configuration setting, or multiple optimizations may be run and then selected between for ongoing system operation.

In an alternate embodiment, the optimizations may be used separately in design or expansion stages. Software may be run on the same processor that may be used in system operation, or also on a separate processor of a computing device for modeling the design or expansion of a power generation system. For example, the optimizations may be used to determine scale of a new generation asset and new related storage asset, or to determine scale of a new storage asset to add to an existing generation asset. The processor may estimate the optimal renewable and storage asset size by performing simulations that assume a given renewable and storage asset configuration and calculate the total revenues or cost savings accrued during an asset lifetime, according to any of Equations 1, 2, 29, 30, 35, 36, 41, 42, or 47. Historical or synthetic renewable generation and forecast scenarios may be used in the simulations. Synthetic renewable generation and forecast scenarios may be produced by sampling from the statistics of historical scenarios and by solving meteorological models so as to be consistent with the fundamental phenomena. Historical or synthetic DA and RT electricity market price scenarios (realized and forecasted) may be used in the simulations. Synthetic DA and RT electricity market price scenarios may be produced by sampling from the statistics of historical scenarios and by solving unit commitment and dispatch models so as to be consistent with the fundamental phenomena. The optimal renewable and storage asset size may be the one that delivers the highest asset owner returns as measured by well-known metrics such as, but not limited to, risk-adjusted internal rate of return or return on investment. The processor may estimate the optimal renewable and storage asset size by comparing the cost of different amounts of renewable and storage with the risk-adjusted benefit (value increase or cost reduction) generated over an expected lifetime of the system.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method to manage operation of a renewable power generation asset, comprising:
   operating one or more computing devices controlling or in communication with one or more control devices of a renewable power generator;
   operating the renewable power generator independent from any bulk energy storage systems;
   obtaining, by the one or more computing devices, historical data pertinent to the renewable power generator as a node within an electrical supply grid, wherein the electrical supply grid is within a market price environment;
   generating, by the one or more computing devices and based on the obtained historical data, forecasts of Day Ahead (DA) and Real Time (RT) prices;
   identifying, by the one or more computing devices, optimal DA power commitments of the renewable power generator across a range of scenarios weighted by probability and by applying one of a maximizing formulation, a balanced combination of mean and variance, or a linear programming framework based on utility functions, wherein:
   $q_{DA}$ is a day ahead commitment;
   $q_x$ is a real time curtailment of renewable generation;
   $q_{RT}$ is a real time renewable generation;
   $p_{DA}$ is a realized day ahead price;
   $p_{RT}$ is a real time price;
   N is a number of possible DA price scenarios, indexed by $1 \leq n \leq N$;
   M is a number of possible renewable generation scenarios, indexed by $1 \leq m \leq M$;
   K is a number of possible RT price scenarios, indexed by $1 \leq k \leq K$;
   $q_{RT,m}$ is a real time renewable generation forecast in an $m^{th}$ scenario;
   $p_{DA,n}$ is a day ahead price forecast in an $n^{th}$ scenario;
   $p_{RT,k}$ is a real time price forecast in a $k^{th}$ scenario;
   $w_{n,m,k}$ is a joint probability of ($p_{DA}=p_{DA,n}$; $q_{RT}=q_{RT,m}$; $p_{RT}=p_{RT,k}$);
   $\gamma_m$ is a factor biasing optimization towards specific generation forecast scenarios;
   $\delta_{RT,n,m,k}$ is a function of deviation from day ahead commitments and market prices, and represents real time penalties;

$$\mu_\alpha \stackrel{def}{=} \sum_{\substack{1 \leq n \leq N \\ 1 \leq m \leq M \\ 1 \leq k \leq K}} w_{n,m,k} \gamma_m \alpha_{n,m,k};$$

$$\alpha_{n,m,k} \stackrel{def}{=} q_{DA}^T \cdot p_{DA,n} + (q_{RT,m} - q_{DA} - q_X)^T \cdot p_{RT,k} - \delta_{RT,n,m,k};$$

applying a maximizing formulation maximizes $$\max_{q_{DA}, q_X} \left\{ \sum_{\substack{1 \leq n \leq N \\ 1 \leq m \leq M \\ 1 \leq k \leq K}} w_{n,m,k} \gamma_m \left( q_{DA}^T \cdot p_{DA,n} + (q_{RT,m} - q_{DA} - q_X)^T \cdot p_{RT,k} - \delta_{RT,n,m,k} \right) \right\};$$

applying a balanced combination of mean and variance maximizes $$\max_{q_{DA}, q_X} \left\{ \mu_\alpha - \lambda \left( \sum_{\substack{1 \leq n \leq N \\ 1 \leq m \leq M \\ 1 \leq k \leq K}} w_{n,m,k} \gamma_m (\alpha_{n,m,k})^2 - \mu_\alpha^2 \right) \right\};$$

and applying a linear programming framework based on utility functions optimizes through one of maximizing utility, maximizing utility subject to a minimum return constraint, minimizing dispersion while subject to a minimum return constraint, or maximizing utility relative to a no risk scenario, where:

$\mu_j \stackrel{def}{=} \Sigma_{1 \leq t \leq T} w_t r_{j,t}$, $\alpha_t \stackrel{def}{=} x^T \cdot r_t = \Sigma_{1 \leq j \leq 2J+1} x_j r_{j,t}, x_{2J+1} = 1$, $$x \stackrel{def}{=} \begin{bmatrix} q_{DA} \\ q_X \\ x_{2J+1} \end{bmatrix},$$

-continued $$r_{n,k} \overset{def}{=} \begin{bmatrix} p_{DA,n} - p_{RT,k} \\ -p_{RT,k} \\ q_{RT,m}^T \cdot p_{RT,k} \end{bmatrix},$$

$\lambda$ is a risk tolerance factor,
maximizing utility uses a linear programming goal $$\max_x \{\mu(x) - \lambda\rho(x)\}, \rho(x) \overset{def}{=} \text{Dispersion},$$

and applies one of:
a mean absolute deviation through:

$$\max_{x,d^-}\left\{\sum_j x_j\mu_j - \lambda\left(\sum_t d_t^- w_t\right): d_t^- \geq \sum_j (\mu_j - r_{j,t})x_j; d_t^- \geq 0; \forall\, t = 1 \ldots T\right\},$$

a minimax through:

$$\max_{x,v}\left\{\sum_j x_j\mu_j - \lambda v : v \geq \sum_j (\mu_j - r_{j,t})x_j; \forall\, t = 1 \ldots T\right\},$$

a conditional value at risk through:

$$\max_{x,d^-,\eta}\left\{\begin{array}{l}\sum_j x_j\mu_j - \lambda\left(\sum_j x_j\mu_j - \eta + \frac{1}{\beta}\sum_t d_t^- w_t\right): \\ d_t^- \geq \eta - \sum_j r_{j,t}x_j; d_t^- \geq 0; \forall\, t = 1 \ldots T\end{array}\right\},$$

with
$\eta \alpha$ VaR at optimum and $\beta \alpha$ probability of returns$\leq$VaR,
$0<\beta\leq 1$,
a Gini mean difference:

$$\max_{x,u}\left\{\begin{array}{l}\sum_j x_j\mu_j - \lambda\left(\sum_j x_j\mu_j - \sum_{t,j} r_{j,t}x_j w_t^2 - 2\sum_{\substack{1\leq t'\leq T-1 \\ t'+1\leq t''\leq T}} u_{t',t''}w_{t'}w_{t''}\right): \\ u_{t',t''} \leq \sum_j r_{j,t'}x_j; u_{t',t''} \leq \sum_j r_{j,t''}x_j; \forall\, t' = \\ 1 \ldots T-1; t'' = t'+1 \ldots T\end{array}\right\},$$

or a weighted conditional value at risk:

$$\max_{x,d^-}\left\{\begin{array}{l}\sum_h \omega_h\left(\sum_j x_j\mu_j - \lambda\left(\sum_j x_j\mu_j - \eta_h + \frac{1}{\beta_h}\sum_t d_{h,t}^- w_t\right)\right): \\ d_{h,t}^- \geq \eta_h - \sum_j r_{j,t}x_j; d_{h,t}^- \geq 0; \forall\, t = 1 \ldots T; \omega_h \in \text{weights}\end{array}\right\};$$

maximizing utility subject to a minimum return constraint uses a linear programming goal $$\max_x\{\mu(x) - \rho(x) : \mu(x) \geq \mu_0\}$$

and applies one of:
a mean absolute deviation through:

$$\max_{x,d^-}\left\{\sum_j x_j\mu_j - \sum_t d_t^- w_t : d_t^- \geq \sum_j (\mu_j - r_{j,t})x_j;\right.$$
$$\left. d_t^- \geq 0; \forall\, t = 1 \ldots T; \sum_j x_j\mu_j \geq \mu_0\right\},$$

a minimax through:

$$\max_{x,v}\left\{\sum_j x_j\mu_j - v : v \geq \sum_j (\mu_j - r_{j,t})x_j; \forall\, t = 1 \ldots T; \sum_j x_j\mu_j \geq \mu_0\right\},$$

a conditional value at risk through:

$$\max_{x,d^-,\eta}$$

$$\left\{\eta - \frac{1}{\beta}\sum_t d_t^- w_t : d_t^- \geq \eta - \sum_j r_{j,t}x_j; d_t^- \geq 0; \forall\, t = 1 \ldots T; \sum_j x_j\mu_j \geq \mu_0\right\},$$

a Gini mean difference:

$$\max_{x,u}\left\{\begin{array}{l}\left(\sum_{t,j} r_{j,t}x_j w_t^2 + 2\sum_{\substack{1\leq t'\leq T-1 \\ t'+1\leq t''\leq T}} u_{t',t''}w_{t'}w_{t''}\right): \\ u_{t',t''} \leq \sum_j r_{j,t'}x_j; u_{t',t''} \leq \sum_j r_{j,t''}x_j; \forall\, t' = \\ 1 \ldots T-1; t'' = t'+1 \ldots T; \sum_j x_j\mu_j \geq \mu_0\end{array}\right\},$$

or a weighted conditional value at risk:

$$\max_{x,d^-}\left\{\begin{array}{l}\sum_h \omega_h\left(\eta_h - \frac{1}{\beta_h}\sum_t d_{h,t}^- w_t\right): \\ d_{h,t}^- \geq \eta_h - \sum_j r_{j,t}x_j; d_{h,t}^- \geq 0; \forall\, t = \\ 1 \ldots T; \omega_h \in \text{weights}; \sum_j x_j\mu_j \geq \mu_0\end{array}\right\};$$

minimizing dispersion while subject to a minimum return constraint uses a linear programming goal $$\min_x\{\rho(x) : \mu(x) \geq \mu_0\}$$

and applies one of:
a mean absolute deviation through:

$$\min_{x,d^-}\left\{\sum_t d_t^- w_t : d_t^- \geq \sum_j (\mu_j - r_{j,t})x_j; d_t^- \geq 0; \forall\, t = 1 \ldots T; \sum_j x_j\mu_j \geq \mu_0\right\},$$

a minimax through:

$$\min_{x,v}\left\{v : v \geq \sum_j (\mu_j - r_{j,t})x_j; \forall t = 1 \ldots T; \sum_j x_j \mu_j \geq \mu_0\right\},$$

a conditional value at risk through:

$$\min_{x,d^-,\eta}\left\{\begin{array}{c}\sum_j x_j\mu_j - \eta + \frac{1}{\beta}\sum_t d_t^- w_t : \\ d_t^- \geq \eta - \sum_j r_{j,t}x_j; d_t^- \geq 0; \forall t = 1 \ldots T; \sum_j x_j\mu_j \geq \mu_0\end{array}\right\},$$

a Gini mean difference:

$$\min_{x,u}\left\{\begin{array}{c}\left(\sum_j x_j\mu_j - \sum_t r_{j,t}x_j w_t^2 - 2\sum_{\substack{1 \leq t' \leq T-1 \\ t'+1 \leq t'' \leq T}} u_{t',t''} w_{t'} w_{t''}\right) : \\ u_{t',t''} \leq \sum_j r_{j,t'}x_j; u_{t',t''} \leq \sum_j r_{j,t''}x_j; \forall t' = \\ 1 \ldots T-1; t'' = t'+1 \ldots T; \sum_j x_j\mu_j \geq \mu_0\end{array}\right\},$$

or a weighted conditional value at risk:

$$\min_{x,d^-}\left\{\begin{array}{c}\sum_j x_j\mu_j - \sum_h \omega_h\left(\eta_h - \frac{1}{\beta_h}\sum_t d_{h,t}^- w_t\right): \\ d_{h,t}^- \geq \eta_h - \sum_j r_{j,t}x_j; d_{h,t}^- \geq 0; \forall t = \\ 1 \ldots T; \omega_h \in \text{weights}; \sum_j x_j\mu_j \geq \mu_0\end{array}\right\};$$

and maximizing utility relative to a no risk scenario uses a linear programming goal $$\max_x\{(\mu(x) - r_0)/\rho(x)\}, r_0 \stackrel{def}{=} \text{risk free return}$$

and applies one of:
a mean absolute deviation through:

$$\max_{\tilde{x},\tilde{d}^-,z}\left\{\begin{array}{c}\sum_j \tilde{x}_j\mu_j - r_0 z : \sum_t \tilde{d}_t^- w_t = z; \tilde{d}_t^- \geq \sum_j(\mu_j - r_{j,t})\tilde{x}_j; \\ \tilde{d}_t^- \geq 0; \forall t = 1 \ldots T; \sum_j \tilde{x}_j = z; \tilde{x}_j \geq 0\end{array}\right\} \Rightarrow x = \tilde{x}/z,$$

a minimax through:

$$\max_{\tilde{x},\tilde{v}}\left\{\begin{array}{c}\sum_j \tilde{x}_j\mu_j - r_0 z : \\ \tilde{v} = z; \tilde{v} \geq \sum_j(\mu_j - r_{j,t})\tilde{x}_j; \forall t = \\ 1 \ldots T; \sum_j \tilde{x}_j = z; \tilde{x}_j \geq 0\end{array}\right\} \Rightarrow x = \tilde{x}/z,$$

a conditional value at risk through:

$$\max_{\tilde{x},\tilde{d}^-,z,\eta}\left\{\begin{array}{c}\sum_j \tilde{x}_j\mu_j - r_0 z : \sum_j \tilde{x}_j\mu_j - \eta + \frac{1}{\beta}\sum_t \tilde{d}_t^- w_t = z; \\ \tilde{d}_t^- \geq \eta - \sum_j r_{j,t}\tilde{x}_j; \tilde{d}_t^- \geq 0; \forall t = \\ 1 \ldots T; \sum_j \tilde{x}_j = z; \tilde{x}_j \geq 0\end{array}\right\} \Rightarrow x = \tilde{x}/z;$$

estimating, by the one or more computing devices, RT schedules for generation by the renewable power generator across a range of scenarios weighted by probability;

applying, by the one or more computing devices, a linear programming framework factoring risk and return preferences of an owner or operator of the renewable power generator, and computing an optimal DA and RT strategy;

controlling, by the one or more computing devices or the one or more control devices in communication with the one or more computing devices, the renewable power generation;

placing, by the one or more computing devices through a market interface to a day ahead energy market, optimal DA commitments for the renewable power generator; and generating and delivering power to the power grid based on the optimal DA and RT strategy or according to the optimal RT generation schedule.

2. A method to manage operation of a renewable power generation asset, comprising:

operating one or more computing devices controlling or in communication with one or more control devices of a renewable power generator;

operating the renewable power generator independent from any bulk energy storage systems;

obtaining, by the one or more computing devices, historical data pertinent to the renewable power generator as a node within an electrical supply grid, wherein the electrical supply grid is within a market price environment;

generating, by the one or more computing devices and based on the obtained historical data, forecasts of Day Ahead (DA) and Real Time (RT) prices;

identifying, by the one or more computing devices, optimal DA power commitments of the renewable power generator across a range of scenarios weighted by probability;

estimating, by the one or more computing devices, RT schedules for generation by the renewable power generator across a range of scenarios weighted by probability and by applying one of a maximizing formulation, a balanced combination of mean and variance, or a linear programming framework based on utility functions, wherein:

$q_{DA}$ is a day ahead commitment;
$q_X$ is a real time curtailment of renewable generation;
$q_{RT}$ is a real time renewable generation;
$p_{DA}$ is a realized day ahead price;
$p_{RT}$ is a real time price;
N is a number of possible DA price scenarios, indexed by $1 \leq n \leq N$;
M is a number of possible renewable generation scenarios, indexed by $1 \leq m \leq M$;

K is a number of possible RT price scenarios, indexed by $1 \leq k \leq K$;

$q_{RT,m}$ is a real time renewable generation forecast in an $m^{th}$ scenario;

$p_{DA,n}$ is a day ahead price forecast in an $n^{th}$ scenario;

$p_{RT,k}$ is a real time price forecast in a $k^{th}$ scenario;

$w_{n,m,k}$ is a joint probability of ($p_{DA}=p_{DA,n}$; $q_{RT}=q_{RT,m}$; $p_{RT}=p_{RT,k}$);

$\gamma_m$ is a factor biasing optimization towards specific generation forecast scenarios;

$\delta_{RT,n,m,k}$ is a function of deviation from day ahead commitments and market prices, and represents real time penalties;

$\widetilde{w}_{m,k}$ is a joint probability of ($q_{RT}=q_{RT,m}$; $p_{RT}=p_{RT,k}$) given a realized $p_{DA}$;

$$\mu_{\tilde{\alpha}} \stackrel{def}{=} \sum_{\substack{0 \leq m \leq M \\ 0 \leq k \leq K}} \widetilde{w}_{m,k} \gamma_m \widetilde{\alpha}_{m,k};$$

$\widetilde{\alpha}_{m,k} \alpha (q_{RT,m} - q_{DA} - q_X)^T \cdot p_{RT,k} - \delta_{RT,m,k}$;

$\lambda$ is a risk tolerance factor;

applying a maximizing formulation maximizes $$\max_{q_X} \left\{ \sum_{\substack{0 \leq m \leq M \\ 0 \leq k \leq K}} \widetilde{w}_{m,k} \gamma_m ((q_{RT,m} - q_{DA} - q_X)^T \cdot p_{RT,k} - \delta_{RT,m,k}) \right\};$$

applying a balanced combination of mean and variance maximizes $$\max_{q_X} \left\{ \mu_{\tilde{\alpha}} - \lambda \left( \sum_{\substack{0 \leq m \leq M \\ 0 \leq k \leq K}} \widetilde{w}_{m,k} \gamma_m (\widetilde{\rho}_{m,k})^2 - \mu_{\tilde{\alpha}}^2 \right) \right\};$$

and applying a linear programming framework based on utility functions optimizes through one of maximizing utility, maximizing utility subject to a minimum return constraint, minimizing dispersion while subject to a minimum return constraint, or maximizing utility relative to a no risk scenario, where:

$\mu_j \alpha \Sigma_{1 \leq t \leq T} w_t r_{j,t}$, $\widetilde{\alpha}_t = x^T \cdot r_t = \Sigma_{1 \leq j \leq J+1} x_j r_{j,t}; x_{J+1} = 1$, $$x \stackrel{def}{=} \begin{bmatrix} q_X \\ x_{J+1} \end{bmatrix},$$

$$r_k \stackrel{def}{=} \begin{bmatrix} -p_{RT,k} \\ (q_{RT,m} - q_{DA})^T \cdot p_{RT,k} \end{bmatrix},$$

maximizing utility uses a linear programming goal $$\max_x \{\mu(x) - \lambda \rho(x)\}, \rho(x) \stackrel{def}{=} \text{Dispersion},$$

and applies one of:

a mean absolute deviation through:

$$\max_{x,d^-} \left\{ \sum_j x_j \mu_j - \lambda \left( \sum_t d_t^- w_t \right) : d_t^- \geq \sum_j (\mu_j - r_{j,t}) x_j; d_t^- \geq 0; \forall t = 1 \ldots T \right\},$$

a minimax through:

$$\max_{x,v} \left\{ \sum_j x_j \mu_j - \lambda v : v \geq \sum_j (\mu_j - r_{j,t}) x_j; \forall t = 1 \ldots T \right\},$$

a conditional value at risk through:

$$\max_{x,d^-,\eta} \left\{ \begin{array}{l} \sum_j x_j \mu_j - \lambda \left( \sum_j x_j \mu_j - \eta + \frac{1}{\beta} \sum_t d_t^- w_t \right) : \\ d_t^- \geq \eta - \sum_j r_{j,t} x_j; d_t^- \geq 0; \forall t = 1 \ldots T \end{array} \right\},$$

with $\eta \alpha$ VaR at optimum and $\beta \alpha$ probability of returns$\leq$VaR, $0 < \beta \leq 1$, a Gini mean difference:

$$\max_{x,u} \left\{ \begin{array}{l} \sum_j x_j \mu_j - \lambda \left( \sum_j x_j \mu_j - \sum_t r_{j,t} x_j w_t^2 - 2 \sum_{\substack{1 \leq t' \leq T-1 \\ t'+1 \leq t'' \leq T}} u_{t',t''} w_{t'} w_{t''} \right) : \\ u_{t',t''} \leq \sum_j r_{j,t'} x_j; u_{t',t''} \leq \sum_j r_{j,t''} x_j; \forall t' = \\ 1 \ldots T-1; t'' = t' + 1 \ldots T \end{array} \right\},$$

or a weighted conditional value at risk:

$$\max_{x,d^-} \left\{ \begin{array}{l} \sum_h \omega_h \left( \sum_j x_j \mu_j - \lambda \left( \sum_j x_j \mu_j - \eta_h + \frac{1}{\beta_h} \sum_t d_{h,t}^- w_t \right) \right) : \\ d_{h,t}^- \geq \eta_h - \sum_j r_{j,t} x_j; d_{h,t}^- \geq 0; \forall t = 1 \ldots T; \omega_h \in \text{weights} \end{array} \right\};$$

maximizing utility subject to a minimum return constraint uses a linear programming goal $$\max_x \{\mu(x) - \rho(x) : \mu(x) \geq \mu_0\}$$

and applies one of:

a mean absolute deviation through:

$$\max_{x,d^-} \left\{ \sum_j x_j \mu_j - \sum_t d_t^- w_t : d_t^- \geq \sum_j (\mu_j - r_{j,t}) x_j; \right.$$

$$\left. d_t^- \geq 0; \forall t = 1 \ldots T; \sum_j x_j \mu_j \geq \mu_0 \right\},$$

a minimax through:

$$\max_{x,v}\left\{\sum_j x_j\mu_j - v : v \geq \sum_j (\mu_j - r_{j,t})x_j; \forall\, t = 1\, \ldots\, T; \sum_j x_j\mu_j \geq \mu_0\right\},$$

a conditional value at risk through:

$$\max_{x,d^-,\eta}\left\{\eta - \frac{1}{\beta}\sum_t d_t^- w_t : d_t^- \geq \eta - \sum_j r_{j,t}x_j; d_t^- \geq 0; \forall\, t = 1\, \ldots\, T; \sum_j x_j\mu_j \geq \mu_0\right\},$$

a Gini mean difference:

$$\max_{x,u}\left\{\begin{array}{l}\left(\sum_{t,j} r_{j,t}x_j w_t^2 + 2\sum_{\substack{1\leq t'\leq T-1 \\ t'+1\leq t''\leq T}} u_{t',t''} w_{t'} w_{t''}\right): \\ u_{t',t''} \leq \sum_j r_{j,t'}x_j; u_{t',t''} \leq \sum_j r_{j,t''}x_j; \forall\, t' = 1\, \cdots\, T-1; t'' = t'+1\, \cdots\, T; \sum_j x_j\mu_j \geq \mu_0\end{array}\right\},$$

or a weighted conditional value at risk:

$$\max_{x,d^-}\left\{\begin{array}{l}\sum_h \omega_h\left(\eta_h + \frac{1}{\beta_h}\sum_t d_{h,t}^- w_t\right): \\ d_{h,t}^- \geq \eta_h - \sum_j r_{j,t}x_j; d_{h,t}^- \geq 0; \forall\, t = 1\, \ldots\, T; \omega_h \in\, \text{weights}; \sum_j x_j\mu_j \geq \mu_0\end{array}\right\};$$

minimizing dispersion while subject to a minimum return constraint uses a linear programming goal $$\min_x\{\rho(x):\mu(x) \geq \mu_0\}$$

and applies one of:
a mean absolute deviation through:

$$\min_{x,d^-}\left\{\sum_t d_t^- w_t : d_t^- \geq \sum_j (\mu_j - r_{j,t})x_j; d_t^- \geq 0; \forall\, t = 1\, \ldots\, T; \sum_j x_j\mu_j \geq \mu_0\right\},$$

a minimax through:

$$\min_{x,v}\left\{v : v \geq \sum_j (\mu_j - r_{j,t})x_j; \forall\, t = 1\, \ldots\, T; \sum_j x_j\mu_j \geq \mu_0\right\},$$

a conditional value at risk through:

$$\min_{x,d^-,\eta}\left\{\begin{array}{l}\sum_j x_j\mu_j - \eta + \frac{1}{\beta}\sum_t d_t^- w_t : \\ d_t^- \geq \eta - \sum_j r_{j,t}x_j; d_t^- \geq 0; \forall\, t = 1\, \ldots\, T; \sum_j x_j\mu_j \geq \mu_0\end{array}\right\},$$

a Gini mean difference:

$$\min_{x,u}\left\{\begin{array}{l}\left(\sum_j x_j\mu_j - \sum_{t,j} r_{j,t}x_j w_t^2 - 2\sum_{\substack{1\leq t'\leq T-1 \\ t'+1\leq t''\leq T}} u_{t',t''} w_{t'} w_{t''}\right): \\ u_{t',t''} \leq \sum_j r_{j,t'}x_j; u_{t',t''} \leq \sum_j r_{j,t''}x_j; \forall\, t' = 1\, \cdots\, T-1; t'' = t'+1\, \cdots\, T; \sum_j x_j\mu_j \geq \mu_0\end{array}\right\},$$

or a weighted conditional value at risk:

$$\min_{x,d^-}\left\{\begin{array}{c}\sum_j x_j\mu_j - \sum_h \omega_h\left(\eta_h + \frac{1}{\beta_h}\sum_t d^-_{h,t}w_t\right):\\ d^-_{h,t} \geq \eta_h - \sum_j r_{j,t}x_j; d^-_{h,t} \geq 0; \forall\, t = 1\,\ldots\,T; \omega_h \in \text{ weights}; \sum_j x_j\mu_j \geq \mu_0\end{array}\right\};$$

and maximizing utility relative to a no risk scenario uses a linear programming goal $$\max_x\{(\mu(x) - r_0)/\rho(x)\}, r_0 \stackrel{def}{=} \text{risk free return}$$

and applies one of:
a mean absolute deviation through:

$$\max_{\tilde{x},\tilde{d}^-,z}\left\{\begin{array}{c}\sum_j \tilde{x}_j\mu_j - r_0 z: \sum_t \tilde{d}^-_t w_t = z; \tilde{d}^-_t \geq \sum_j (\mu_j - r_{j,t})\tilde{x}_j;\\ \tilde{d}^-_{h,t} \geq 0; \forall\, t = 1\,\ldots\,T; \sum_j \tilde{x}_j = z; \tilde{x}_j \geq 0\end{array}\right\} \Rightarrow x = \tilde{x}/z,$$

a minimax through:

$$\max_{\tilde{x},\tilde{v}}\left\{\begin{array}{c}\sum_j \tilde{x}_j\mu_j - r_0 z:\\ \tilde{v} = z; \tilde{v} \geq \sum_j (\mu_j - r_{j,t})\tilde{x}_j; \forall\, t = 1\,\ldots\,T; \sum_j \tilde{x}_j = z; \tilde{x}_j \geq 0\end{array}\right\} \Rightarrow x = \tilde{x}/z,$$

a conditional value at risk through:

$$\max_{\tilde{x},\tilde{d}^-,z,\eta}\left\{\begin{array}{c}\sum_j \tilde{x}_j\mu_j - r_0 z: \sum_j \tilde{x}_j\mu_j - \eta + \frac{1}{\beta}\sum_t \tilde{d}^-_t w_t = z;\\ \tilde{d}^-_t \geq \eta - \sum_j r_{j,t}\tilde{x}_j; \tilde{d}^-_t \geq 0; \forall\, t = 1\,\ldots\,T; \sum_j \tilde{x}_j = z; \tilde{x}_j \geq 0\end{array}\right\} \Rightarrow x = \tilde{x}/z;$$

applying, by the one or more computing devices, a linear programming framework factoring risk and return preferences of an owner or operator of the renewable power generator, and computing an optimal DA and RT strategy;

controlling, by the one or more computing devices or the one or more control devices in communication with the one or more computing devices, the renewable power generation;

placing, by the one or more computing devices through a market interface to a day ahead energy market, optimal DA commitments for the renewable power generator; and generating and delivering power to the power grid based on the optimal DA and RT strategy or according to the optimal RT generation schedule.

3. A method to manage operation of a renewable power generation asset, comprising:

operating one or more computing devices controlling or in communication with one or more control devices of a renewable power generator;

controlling operation, by the one or more computing devices, of one or more bulk energy storage systems in association with the renewable power generator, each of the one or more bulk energy storage systems being of short duration energy storage or of long duration energy storage;

obtaining, by the one or more computing devices, historical data pertinent to the renewable power generator as a node within an electrical supply grid, wherein the electrical supply grid is within a market price environment;

generating, by the one or more computing devices and based on the obtained historical data, forecasts of Day Ahead (DA) and Real Time (RT) prices;

identifying, by the one or more computing devices, optimal DA power commitments of the renewable power generator across a range of scenarios weighted by probability and by applying one of a maximizing formulation, a balanced combination of mean and variance, or a linear programming framework based on utility functions, wherein:

$q_{DA}$ is a day ahead commitment;
$q_x$ is a real time curtailment of renewable generation;
$q_{RT}$ is a real time renewable generation;
$p_{DA}$ is a realized day ahead price;
$p_{RT}$ is a real time price;
$c_{RT}$ is a RT optimal charge schedule of a storage system;
$c_p$ is a unit power cost of the storage system amortized in an optimization horizon;
$c_E$ is a unit energy cost of the storage system amortized in the optimization horizon;
$d_{RT}$ is a RT optimal discharge schedule of the storage system;
$P_{ESS}$ is a rated power of the storage system;
$E_{ESS}$ is a rated energy of the storage system;
N is a number of possible DA price scenarios, indexed by $1 \leq n \leq N$;
M is a number of possible renewable generation scenarios, indexed by $1 \leq m \leq M$;
K is a number of possible RT price scenarios, indexed by $1 \leq k \leq K$;
$q_{RT,m}$ is a real time renewable generation forecast in an $m^{th}$ scenario;
$p_{DA,n}$ is a day ahead price forecast in an $n^{th}$ scenario;
$p_{RT,k}$ is a real time price forecast in a $k^{th}$ scenario;
$w_{n,m,k}$ is a joint probability of $(p_{DA}=p_{DA,n}; q_{RT}=q_{RT,m}; P_{RT}=p_{RT,k})$;
$\gamma_m$ is a factor biasing optimization towards specific generation forecast scenarios;
$\delta_{RT,n,m,k}$ is a function of deviation from day ahead commitments and market prices, and represents real time penalties;

$$\mu_\vartheta \stackrel{def}{=} \sum_{\substack{1 \leq n \leq N \\ 1 \leq m \leq M \\ 1 \leq k \leq K}} w_{n,m,k}\gamma_m\vartheta_{n,m,k};$$

$\vartheta_{n,m,k} \alpha\ q_{DA}{}^T \cdot p_{DA,n} + (q_{RT,m} + d_{RT} - c_{RT} - q_{DA} - q_X)^T \cdot p_{RT,k} - \delta_{RT,n,m,k} - c_P P_{ESS} - c_E E_{ESS};$ $\eta_d \alpha$ Discharge efficiency;
$\eta_c \alpha$ Charge efficiency;
$\lambda$ is a risk tolerance factor;
applying a maximizing formulation maximizes $$\max_{q_{DA}, q_X, d_{RT}, c_{RT}, P_{ESS}, E_{ESS}} \left\{ \sum_{\substack{1 \le n \le N \\ 1 \le m \le M \\ 1 \le k \le K}} w_{n,m,k} \gamma_m \big( q_{DA}{}^T \cdot p_{DA,n} + (q_{RT,m} + d_{RT} - c_{RT} - q_{DA} - q_X)^T \cdot p_{RT,k} - \delta_{RT,n,m,k} - c_P P_{ESS} - c_E E_{ESS} \big) \right\}$$

where $d_{RT,j} \le P_{ESS} \forall\ j$, $c_{RT,j} \le P_{ESS} \forall\ j$, $$SOC_{j+1} = SOC_j - \frac{d_{RT,j}}{\eta_d} + \eta_c c_{RT,j} \forall\ j,\ 0 \le SOC_{j+1} \le E_{ESS} \forall\ j;$$

applying a balanced combination of mean and variance maximizes $$\max_{q_{DA}, q_X, d_{RT}, c_{RT}, P_{ESS}, E_{ESS}} \left\{ \mu_\vartheta - \lambda \left( \sum_{\substack{1 \le n \le N \\ 1 \le m \le M \\ 1 \le k \le K}} w_{n,m,k} \gamma_m (\vartheta_{n,m,k})^2 - \mu_\vartheta^2 \right) \right\};$$

and applying a linear programming framework based on utility functions optimizes through one of maximizing utility, maximizing utility subject to a minimum return constraint, minimizing dispersion while subject to a minimum return constraint, or maximizing utility relative to a no risk scenario, where:

$\mu_j \alpha\ \Sigma_{1 \le t \le T} w_t r_{j,t}$, $\vartheta_t = x^T \cdot r_t = \Sigma_{1 \le j \le 4J+3} x_j r_{j,t}; x_{4J+3} = 1$, $$x \stackrel{def}{=} \begin{Bmatrix} q_{DA} \\ q_X \\ d_{RT} \\ c_{RT} \\ P_{ESS} \\ E_{ESS} \\ x_{4J+3} \end{Bmatrix}, r_{n,m,k} \stackrel{def}{=} \begin{Bmatrix} p_{DA,n} - p_{RT,k} \\ -p_{RT,k} \\ p_{RT,k} \\ -p_{RT,k} \\ -c_P \\ -c_E \\ q_{RT,m}{}^T \cdot p_{RT,k} \end{Bmatrix},$$

maximizing utility uses a linear programming goal $$\max_x \{\mu(x) - \lambda \rho(x)\},\ \rho(x) \stackrel{def}{=} \text{Dispersion},$$

and applies one of:
a mean absolute deviation through:

$$\max_{x, d^-} \left\{ \sum_j x_j \mu_j - \lambda \left( \sum_t d_t^- w_t \right) : d_t^- \ge \left( \sum_j (\mu_j - r_{j,t}) x_j \right); d_t^- \ge 0; \forall\ t = 1 \ldots T \right\},$$

a minimax through:

$$\max_{x, v} \left\{ \sum_j x_j \mu_j - \lambda v : v \ge \left( \sum_j (\mu_j - r_{j,t}) x_j \right); \forall\ t = 1 \ldots T \right\},$$

a conditional value at risk through:

$$\max_{x, d^-, \eta} \left\{ \sum_j x_j \mu_j - \lambda \left( \sum_j x_j \mu_j - \eta + \frac{1}{\beta} \sum_t d_t^- w_t \right) : d_t^- \ge \eta - \sum_j r_{j,t} x_j;\ d_t^- \ge 0; \forall\ t = 1 \ldots T \right\},$$

with
$\eta \alpha$ VaR at optimum and $\beta \alpha$ probability of returns$\le$VaR, $0 < \beta \le 1$,
a Gini mean difference:

$$\max_{x, u} \left\{ \sum_j x_j \mu_j - \lambda \left( \sum_j x_j \mu_j - \sum_{t,j} r_{j,t} x_j w_t^2 - 2 \sum_{\substack{1 \le t' \le T-1 \\ t'+1 \le t'' \le T}} u_{t',t''} w_{t'} w_{t''} \right) :\ u_{t',t''} \le \sum_j r_{j,t'} x_j;\ u_{t',t''} \le \sum_j r_{j,t''} x_j; \forall\ t' = 1 \ldots T-1;\ t'' = t'+1 \ldots T \right\},$$

or a weighted conditional value at risk:

$$\max_{x, d^-} \left\{ \sum_h \omega_h \left( \sum_j x_j \mu_j - \lambda \left( \sum_j x_j \mu_j - \eta_h + \frac{1}{\beta_h} \sum_t d_{h,t}^- w_t \right) \right) :\ d_t^- \ge \eta_h - \sum_j r_{j,t} x_j;\ d_{h,t}^- \ge 0; \forall\ t = 1 \ldots T;\ \omega_h \in \text{weights} \right\};$$

maximizing utility subject to a minimum return constraint uses a linear programming goal $$\max_x \{\mu(x) - \rho(x) : \mu(x) \ge \mu_0\}$$

and applies one of:
a mean absolute deviation through:

$$\max_{x,d^-}\left\{\sum_j x_j\mu_j - \sum_t d_t^- w_t : d_t^- \geq \sum_j (\mu_j - r_{j,t})x_j;\right.$$

$$\left. d_t^- \geq 0; \forall\, t = 1 \ldots T; \sum_j x_j\mu_j \geq \mu_0\right\},$$

a minimax through:

$$\max_{x,v}\left\{\sum_j x_j\mu_j - v : v \geq \sum_j (\mu_j - r_{j,t})x_j; \forall\, t = 1 \ldots T; \sum_j x_j\mu_j \geq \mu_0\right\},$$

a conditional value at risk through:

$$\max_{x,d^-,\eta}$$

$$\left\{\eta - \frac{1}{\beta}\sum_t d_t^- w_t : d_t^- \geq \eta - \sum_j r_{j,t}x_j; d_t^- \geq 0; \forall\, t = 1 \ldots T; \sum_j x_j\mu_j \geq \mu_0\right\},$$

a Gini mean difference:

$$\max_{x,u}\left\{\left(\sum_t \sum_j r_{j,t}x_j w_t^2 + 2\sum_{\substack{1 \leq t' \leq T-1 \\ t'+1 \leq t'' \leq T}} u_{t',t''}w_{t'}w_{t''}\right) : \right.$$
$$\left. u_{t',t''} \leq \sum_j r_{j,t'}x_j; u_{t',t''} \leq \sum_j r_{j,t''}x_j; \forall\, t' = 1 \ldots T-1; t'' = t'+1 \ldots T; \sum_j x_j\mu_j \geq \mu_0\right\}$$

or a weighted conditional value at risk:

$$\max_{x,d^-}$$

$$\left\{E_h\omega_h\left(\eta_h - \frac{1}{\beta_h}\sum_t d_{h,t}^- w_t\right) : \right.$$
$$\left. d_{h,t}^- \geq \eta_h - \sum_j r_{j,t}x_j; d_{h,t}^- \geq 0; \forall\, t = 1 \ldots T; \omega_h \in \text{weights}; \sum_j x_j\mu_j \geq \mu_0\right\};$$

minimizing dispersion while subject to a minimum return constraint uses a linear programming goal $$\min_x\{\rho(x) : \mu(x) \geq \mu_0\}$$

and applies one of:
a mean absolute deviation through:

$$\min_{x,d^-}\left\{\sum_t d_t^- w_t : d_t^- \geq \sum_j (\mu_j - r_{j,t})x_j; d_t^- \geq 0; \forall\, t = 1 \ldots T; \sum_j x_j\mu_j \geq \mu_0\right\},$$

a minimax through:

$$\min_{x,v}\left\{v : v \geq \sum_j (\mu_j - r_{j,t})x_j; \forall\, t = 1 \ldots T; \sum_j x_j\mu_j \geq \mu_0\right\},$$

a conditional value at risk through:

$$\min_{x,d^-,\eta}\left\{\sum_j x_j\mu_j - \eta + \frac{1}{\beta}\sum_t d_t^- w_t : \right.$$
$$\left. d_t^- \geq \eta - \sum_j r_{j,t}x_j; d_t^- \geq 0; \forall\, t = 1 \ldots T; \sum_j x_j\mu_j \geq \mu_0\right\},$$

a Gini mean difference:

$$\min_{x,u}\left\{\begin{array}{l}\left(\sum_j x_j\mu_j - \sum_{j,t} r_{j,t}x_j w_t^2 - 2\sum_{\substack{1\leq t'\leq T-1\\t'+1\leq t''\leq T}} u_{t',t''}w_{t'}w_{t''}\right):\\ u_{t',t''}\leq \sum_j r_{j,t'}x_j; u_{t',t''}\leq \sum_j r_{j,t''}x_j; \forall\, t' = 1\ \ldots\ T-1; t'' = t'+1\ \ldots\ T; \sum_j x_j\mu_j \geq \mu_0\end{array}\right\},$$

or a weighted conditional value at risk:

$$\min_{x,d^-}\left\{\begin{array}{l}\sum_j x_j\mu_j - \sum_h \omega_h\left(\eta_h - \dfrac{1}{\beta_h}\sum_t d^-_{h,t}w_t\right):\\ d^-_{h,t}\geq \eta_h - \sum_j r_{j,t}x_j; d^-_{h,t}\geq 0,\ \forall\, t = 1\ \ldots\ T; \omega_h\in\text{ weights}; \sum_j x_j\mu_j \geq \mu_0\end{array}\right\};$$

and maximizing utility relative to a no risk scenario uses a linear programming goal $$\max_x\{(\mu(x) - r_0)/\rho(x)\}, r_0 \stackrel{def}{=} \text{risk free return}$$

and applies one of:
a mean absolute deviation through:

$$\max_{\bar x, d^-, z}\left\{\begin{array}{l}\sum_j \bar x_j\mu_j - r_0 z{:} \sum_t d^-_t w_t = z; d^-_t \geq \sum_j(\mu_j - r_{j,t})\bar x_j;\\ d^-_t \geq 0; \forall\, t = 1\ \ldots\ T; \sum_j \bar x_j = z; \bar x_j \geq 0\end{array}\right\}\Rightarrow x = \bar x/z,$$

a minimax through:

$$\max_{\bar x,\bar v}\left\{\begin{array}{l}\sum_j \bar x_j\mu_j - r_0 z{:}\\ \bar v = z; \bar v \geq \sum_j(\mu_j - r_{j,t})\bar x_j; \forall\, t = 1\ \ldots\ T; \sum_j \bar x_j = z; \bar x_j \geq 0\end{array}\right\}\Rightarrow x = \bar x/z,$$

a conditional value at risk through:

$$\max_{\bar x, d^-, z, \eta}\left\{\begin{array}{l}\sum_j \bar x_j\mu_j - r_0 z{:} \sum_j \bar x_j\mu_j - \eta + \dfrac{1}{\beta}\sum_t d^-_t w_t = z;\\ d^-_t \geq \eta - \sum_j r_{j,t}\bar x_j; d^-_t \geq 0; \forall\, t = 1\ \ldots\ T; \sum_j \bar x_j = z; \bar x_j \geq 0\end{array}\right\}\Rightarrow x = \bar x/z;$$

estimating, by the one or more computing devices, RT schedules for generation by the renewable power generator across a range of scenarios weighted by probability;

applying, by the one or more computing devices, a linear programming framework factoring risk and return preferences of an owner or operator of the renewable power generator, and computing an optimal DA and RT strategy;

controlling, by the one or more computing devices or the one or more control devices in communication with the one or more computing devices, the renewable power generation;

placing, by the one or more computing devices through a market interface to a day ahead energy market, optimal DA commitments for the renewable power generator; and generating and delivering power to the power grid based on the optimal DA and RT strategy or according to the optimal RT generation schedule.

4. A method to manage operation of a renewable power generation asset, comprising:

operating one or more computing devices controlling or in communication with one or more control devices of a renewable power generator;

controlling operation, by the one or more computing devices, of one or more bulk energy storage systems in association with the renewable power generator, each of the one or more bulk energy storage systems being of short duration energy storage or of long duration energy storage;

obtaining, by the one or more computing devices, historical data pertinent to the renewable power generator as a node within an electrical supply grid, wherein the electrical supply grid is within a market price environment;

generating, by the one or more computing devices and based on the obtained historical data, forecasts of Day Ahead (DA) and Real Time (RT) prices;

identifying, by the one or more computing devices, optimal DA power commitments of the renewable power generator across a range of scenarios weighted by probability;

estimating, by the one or more computing devices, RT schedules for generation by the renewable power generator across a range of scenarios weighted by probability and by applying one of a maximizing formulation, a balanced combination of mean and variance, or a linear programming framework based on utility functions, wherein:

$q_{DA}$ is a day ahead commitment;
$q_X$ is a real time curtailment of renewable generation;
$q_{RT}$ is a real time renewable generation;
$p_{DA}$ is a realized day ahead price;
$p_{RT}$ is a real time price;

$c_{RT}$ is a RT optimal charge schedule of a storage system;
$c_p$ is a unit power cost of the storage system amortized in an optimization horizon;
$c_E$ is a unit energy cost of the storage system amortized in the optimization horizon;
$d_{RT}$ is a RT optimal discharge schedule of the storage system;
$P_{ESS}$ is a rated power of the storage system;
$E_{ESS}$ is a rated energy of the storage system;
N is a number of possible DA price scenarios, indexed by $1 \leq n \leq N$;
M is a number of possible renewable generation scenarios, indexed by $1 \leq m \leq M$;
K is a number of possible RT price scenarios, indexed by $1 \leq k \leq K$;
$q_{RT,m}$ is a real time renewable generation forecast in an $m^{th}$ scenario;
$p_{DA,n}$ is a day ahead price forecast in an $n^{th}$ scenario;
$p_{RT,k}$ is a real time price forecast in a $k^{th}$ scenario;
$w_{n,m,k}$ is a joint probability of ($p_{DA}=p_{DA,n}$; $q_{RT}=q_{RT,m}$; $p_{RT}=p_{RT,k}$);
$\gamma_m$ is a factor biasing optimization towards specific generation forecast scenarios;
$\delta_{RT,n,m,k}$ is a function of deviation from day ahead commitments and market prices, and represents real time penalties;

$$\mu\vartheta \stackrel{def}{=} \sum_{\substack{1 \leq n \leq N \\ 1 \leq m \leq M \\ 1 \leq k \leq K}} w_{n,m,k} \gamma_m \vartheta_{n,m,k};$$

$\vartheta_{n,m,k} \alpha \; q_{DA}^T \cdot p_{DA,n} + (q_{RT,m} + d_{RT} - c_{RT} - q_{DA} - q_X)^T \cdot p_{RT,k} - \delta_{RT,n,m,k} - c_P P_{ESS} - c_E E_{ESS}$;

$\eta_d \alpha$ Discharge efficiency;
$\eta_c \alpha$ Charge efficiency;
$\lambda$ is a risk tolerance factor;
applying a maximizing formulation maximizes $$\max_{q_X, d_{RT}, c_{RT}, P_{ESS}, E_{ESS}} \left\{ \sum_{\substack{0 \leq m \leq M \\ 0 \leq k \leq K}} \widetilde{w}_{m,k} \gamma_m \left( (q_{RT,m} + d_{RT} - c_{RT} - q_{DA} - q_X)^T \cdot p_{RT,k} - \delta_{RT,m,k} - c_P P_{ESS} - c_E E_{ESS} \right) \right\}$$

where:
$d_{RT,j} \leq P_{ESS} \forall j$,
$c_{RT,j} \leq P_{ESS} \forall j$, $$SOC_{j+1} = SOC_j - \frac{d_{RT,j}}{\eta_d} + \eta_c c_{RT,j} \forall \; j,$$

and
$0 \leq SOC_{j+1} \leq E_{ESS} \forall j$;

applying a balanced combination of mean and variance maximizes $$\max_{q_X, d_{RT}, c_{RT}, P_{ESS}, E_{ESS}} \left\{ \mu_{\tilde{\vartheta}} - \lambda \left( \sum_{\substack{0 \leq m \leq M \\ 0 \leq k \leq K}} \widetilde{w}_{m,k} \gamma_m (\widetilde{\vartheta_{m,k}})^2 - \mu_{\tilde{\vartheta}}^2 \right) \right\}$$

where:

$$\mu_{\tilde{\vartheta}} \stackrel{def}{=} \sum_{\substack{0 \leq m \leq M \\ 0 \leq k \leq K}} \widetilde{w}_{m,k} \gamma_m \widetilde{\vartheta_{m,k}},$$

and $\widetilde{\vartheta_{m,k}} \alpha \; (q_{RT,m} + d_{RT} - c_{RT} - q_{DA} - q_X)^T \cdot p_{RT,k} - \delta_{RT,m,k} - c_P P_{ESS} - c_E E_{ESS}$; and applying a linear programming framework based on utility functions optimizes through one of maximizing utility, maximizing utility subject to a minimum return constraint, minimizing dispersion while subject to a minimum return constraint, or maximizing utility relative to a no risk scenario, where:

$\mu_j \alpha \; \Sigma_{1 \leq t \leq T} w_t r_{j,t}$;

$\hat{\vartheta}_t = x^T \cdot r_t - \Sigma_{1 \leq j \leq 3J+3} x_j r_{j,t}, x_{3J+3} = 1$;

$$x \stackrel{def}{=} \begin{bmatrix} q_X \\ d_{RT} \\ c_{RT} \\ P_{ESS} \\ E_{ESS} \\ x_{3J+3} \end{bmatrix};$$

$$r_k \stackrel{def}{=} \begin{bmatrix} -p_{RT,k} \\ p_{RT,k} \\ -p_{RT,k} \\ -c_P \\ -c_E \\ (q_{RT,m} - q_{DA})^T \cdot p_{RT,k} \end{bmatrix};$$

maximizing utility uses a linear programming goal $$\max_x \{\mu(x) - \lambda \rho(x)\}, \rho(x) \stackrel{def}{=} \text{Dispersion},$$

and applies one of:
a mean absolute deviation through:

$$\max_{x,d^-} \left\{ \sum_j x_j \mu_j - \lambda \left( \sum_t d_t^- w_t \right) : d_t^- \geq \sum_j (\mu_j - r_{j,t}) x_j; d_t^- \geq 0; \forall \; t = 1 \ldots T \right\},$$

a minimax through:

$$\max_{x,\nu} \left\{ \sum_j x_j \mu_j - \lambda \nu : \nu \geq \sum_j (\mu_j - r_{j,t}) x_j; \forall \; t = 1 \ldots T \right\},$$

a conditional value at risk through:

$$\max_{x,d^-,\eta}\left\{\begin{array}{l}\sum_j x_j\mu_j - \lambda\left(\sum_j x_j\mu_j - \eta + \frac{1}{\beta}\sum_t d_t^- w_t\right):\\ d_t^- \geq \eta - \sum_j r_{j,t}x_j;\ d_t^- \geq 0;\ \forall\ t = 1\ \ldots\ T\end{array}\right\},$$

with $\eta \alpha$ VaR at optimum and $\beta \alpha$ probability of returns≤VaR, $0<\beta\leq 1$, a Gini mean difference:

$$\max_{x,u}\left\{\begin{array}{l}\sum_j x_j\mu_j - \lambda\left(\sum_j x_j\mu_j - \sum_t r_{j,t}x_j w_t^2 - 2\sum_{\substack{1\leq t'\leq T-1\\ j\\ t'+1\leq t''\leq T}} u_{t',t''}w_{t'}w_{t''}\right):\\ u_{t',t''} \leq \sum_j r_{j,t'}x_j;\ u_{t',t''} \leq \sum_j r_{j,t''}x_j;\\ \forall\ t' = 1\ \ldots\ T-1;\ t'' = t'+1\ \ldots\ T\end{array}\right\},$$

or a weighted conditional value at risk:

$$\max_{x,d^-}\left\{\begin{array}{l}\sum_h \omega_h\left(\sum_j x_j\mu_j - \lambda\left(\sum_j x_j\mu_j - \eta_h + \frac{1}{\beta_h}\sum_t d_{h,t}^- w_t\right)\right):\\ d_{h,t}^- \geq \eta_h - \sum_j r_{j,t}x_j;\ d_{h,t}^- \geq 0;\ \forall\ t = 1\ \ldots\ T;\ \omega_h \in \text{weights}\end{array}\right\};$$

maximizing utility subject to a minimum return constraint uses a linear programming goal $$\max_x\{\mu(x) - \rho(x):\mu(x) \geq \mu_0\}$$

and applies one of:

a mean absolute deviation through:

$$\max_{x,d^-}\left\{\begin{array}{l}\sum_j x_j\mu_j - \sum_t d_t^- w_t:d_t^- \geq \sum_j (\mu_j - r_{j,t})x_j;\\ d_t^- \geq 0;\ \forall\ t = 1\ \ldots\ T;\ \sum_j x_j\mu_j \geq \mu_0\end{array}\right\},$$

a minimax through:

$$\max_{x,v}\left\{\sum_j x_j\mu_j - v:v \geq \sum_j (\mu_j - r_{j,t})x_j;\ \forall\ t = 1\ \ldots\ T;\ \sum_j x_j\mu_j \geq \mu_0\right\},$$

a conditional value at risk through:

$$\max_{x,d^-,\eta}\left\{\begin{array}{l}\eta - \frac{1}{\beta}\sum_t d_t^- w_t:d_t^- \geq \eta - \sum_j r_{j,t}x_j;\ d_t^- \geq 0;\\ \forall\ t = 1\ \ldots\ T;\ \sum_j x_j\mu_j \geq \mu_0\end{array}\right\},$$

a Gini mean difference:

$$\max_{x,u}\left\{\begin{array}{l}\left(\sum_t r_{j,t}x_j w_t^2 + 2\sum_{\substack{1\leq t'\leq T-1\\ t'+1\leq t''\leq T}} u_{t',t''}w_{t'}w_{t''}\right):\\ u_{t',t''} \leq \sum_j r_{j,t'}x_j;\ u_{t',t''} \leq \sum_j r_{j,t''}x_j;\ \forall\ t' =\\ 1\ \ldots\ T-1;\ t'' = t'+1\ \ldots\ T;\ \sum_j x_j\mu_j \geq \mu_0\end{array}\right\},$$

or a weighted conditional value at risk:

$$\max_{x,d^-}\left\{\begin{array}{l}\sum_h \omega_h\left(\eta_h - \frac{1}{\beta_h}\sum_t d_{h,t}^- w_t\right):\\ d_{h,t}^- \geq \eta_h - \sum_j r_{j,t}x_j;\ d_{h,t}^- \geq 0;\ \forall\ t =\\ 1\ \ldots\ T;\ \omega_h \in \text{weights};\ \sum_j x_j\mu_j \geq \mu_0\end{array}\right\};$$

minimizing dispersion while subject to a minimum return constraint uses a linear programming goal $$\min_x\{\rho(x):\mu(x) \geq \mu_0\}$$

and applies one of:

a mean absolute deviation through:

$$\min_{x,d^-}\left\{\sum_t d_t^- w_t:d_t^- \geq \sum_j (\mu_j - r_{j,t})x_j;\ d_t^- \geq 0;\ \forall\ t = 1\ \ldots\ T;\ \sum_j x_j\mu_j \geq \mu_0\right\},$$

a minimax through:

$$\min_{x,v}\left\{v:v \geq \sum_j (\mu_j - r_{j,t})x_j;\ \forall\ t = 1\ \ldots\ T;\ \sum_j x_j\mu_j \geq \mu_0\right\},$$

a conditional value at risk through:

$$\min_{x,d^-,\eta}\left\{\begin{array}{l}\sum_j x_j\mu_j - \eta + \frac{1}{\beta}\sum_t d_t^- w_t:\\ d_t^- \geq \eta - \sum_j r_{j,t}x_j;\ d_t^- \geq 0;\ \forall\ t = 1\ \ldots\ T;\ \sum_j x_j\mu_j \geq \mu_0\end{array}\right\},$$

a Gini mean difference:

$$\min_{x,u}\left\{\begin{array}{l}\left(\sum_j x_j\mu_j - \sum_t r_{j,t}x_j w_t^2 - 2\sum_{\substack{1\leq t'\leq T-1\\ j\\ t'+1\leq t''\leq T}} u_{t',t''}w_{t'}w_{t''}\right):\\ u_{t',t''} \leq \sum_j r_{j,t'}x_j;\ u_{t',t''} \leq \sum_j r_{j,t''}x_j;\ \forall\ t' =\\ 1\ \ldots\ T-1;\ t'' = t'+1\ \ldots\ T;\ \sum_j x_j\mu_j \geq \mu_0\end{array}\right\},$$

or a weighted conditional value at risk:

$$\min_{x,d^-}\left\{\begin{array}{l}\sum_j x_j\mu_j - \sum_h \omega_h\left(\eta_h - \frac{1}{\beta_h}\sum_t d^-_{h,t}w_t\right):\\ d^-_{h,t} \geq \eta_h - \sum_j r_{j,t}x_j; d^-_{h,t} \geq 0; \forall\, t =\\ 1\,\ldots\,T; \omega_h \in \text{weights}; \sum_j x_j\mu_j \geq \mu_0\end{array}\right\};$$

and maximizing utility relative to a no risk scenario uses a linear programming goal $$\max_x\{(\mu(x) - r_0)/\rho(x)\}, r_0 \stackrel{\text{def}}{=} \text{risk free return}$$

and applies one of:
a mean absolute deviation through:

$$\max_{\tilde{x},\tilde{d}^-,z}\left\{\begin{array}{l}\sum_j \tilde{x}_j\mu_j - r_0z: \sum_t \tilde{d}^-_t w_t = z; \tilde{d}^-_t \geq \sum_j(\mu_j - r_{j,t})\tilde{x}_j;\\ \tilde{d}^-_t \geq 0; \forall\, t = 1\,\ldots\,T; \sum_j \tilde{x}_j = z; \tilde{x}_j \geq 0\end{array}\right\} \Rightarrow x = \tilde{x}/z,$$

a minimax through:

$$\max_{\tilde{x},\tilde{v}}\left\{\begin{array}{l}\sum_j \tilde{x}_j\mu_j - r_0z:\\ \tilde{v} = z; \tilde{v} \geq \sum_j(\mu_j - r_{j,t})\tilde{x}_j; \forall\, t =\\ 1\,\ldots\,T; \sum_j \tilde{x}_j = z; \tilde{x}_j \geq 0\end{array}\right\} \Rightarrow x = \tilde{x}/z,$$

a conditional value at risk through:

$$\max_{\tilde{x},\tilde{d}^-,z,\eta}\left\{\begin{array}{l}\sum_j \tilde{x}_j\mu_j - r_0z: \sum_j \tilde{x}_j\mu_j - \eta + \frac{1}{\beta}\sum_t \tilde{d}^-_t w_t = z;\\ \tilde{d}^-_t \geq \eta - \sum_j r_{j,t}\tilde{x}_j; \tilde{d}^-_t \geq 0; \forall\, t =\\ 1\,\ldots\,T; \sum_j \tilde{x}_j = z; \tilde{x}_j \geq \mu_0\end{array}\right\} \Rightarrow x = \tilde{x}/z;$$

applying, by the one or more computing devices, a linear programming framework factoring risk and return preferences of an owner or operator of the renewable power generator, and computing an optimal DA and RT strategy;

controlling, by the one or more computing devices or the one or more control devices in communication with the one or more computing devices, the renewable power generation;

placing, by the one or more computing devices through a market interface to a day ahead energy market, optimal DA commitments for the renewable power generator; and generating and delivering power to the power grid based on the optimal DA and RT strategy or according to the optimal RT generation schedule.

5. A method to manage operation of a renewable power generation asset, comprising:

operating one or more computing devices controlling or in communication with one or more control devices of a renewable power generator;

obtaining, by the one or more computing devices, historical data pertinent to the renewable power generator as a node within an electrical supply grid, wherein the electrical supply grid is within a regulated environment;

generating, by the one or more computing devices and based on the obtained historical data, forecasts of power demand, power supply, generation from the renewable power generator, and costs of operating the renewable power generator;

identifying, by the one or more computing devices, optimal DA power commitments of the renewable power generator across a range of scenarios weighted by probability;

estimating, by the one or more computing devices, RT schedules for generation by the renewable power generator across a range of scenarios weighted by probability;

applying, by the one or more computing devices, a linear programming framework factoring risk and return preferences of an owner or operator of the renewable power generator, and computing an optimal RT generation schedule;

computing, by the one or more computing devices, an optimal RT curtailment, energy storage, and energy dispatch strategy using cost minimization through:

$$\min_{q_X,d_{RT},c_{RT}}\left\{\sum_{\substack{0\leq i\leq I\\ 0\leq m\leq M}} w_{i,m}\gamma_m\left((l_{RT,i} - q_{RT,m} - d_{RT} + c_{RT} + q_X)^T \cdot c_{RT,i,m}\right)\right\}$$

where
$q_x$ is a real time curtailment of renewable generation,
$c_{RT}$ is a RT optimal charge schedule of a storage system,
$d_{RT}$ is a RT optimal discharge schedule of the storage system,
$P_{ESS}$ is a rated power of the storage system,
$E_{ESS}$ is a rated energy of the storage system,
M is a number of possible renewable generation scenarios, indexed by $1 \leq m \leq M$,
J is a number of discretized time steps in an optimization horizon, indexed by $1 \leq j \leq J$,
I is a number of possible power demand scenarios, indexed by $1 \leq i \leq I$,
$q_{RT,m}$ is a real time renewable generation forecast in an $m^{th}$ scenario,
$l_{RT,m}$ is a demand forecast in an $i^{th}$ scenario,
$w_{i,m}$ is defined to be the joint probability of ($l_{RT}=l_{RT,i}$; $q_{RT}=q_{RT,m}$),
$\gamma_m$ is a factor biasing optimization towards specific generation forecast scenarios, $d_{RT,j} \leq P_{ESS} \forall j$, $c_{RT,j} \leq P_{ESS} \forall j$, $$SOC_{j+1} = SOC_j - \frac{d_{RT,j}}{\eta_d} + \eta_c c_{RT,j} \forall\, j,$$

$0 \leq SOC_{j+1} \leq E_{ESS} \forall j$, $\eta_d \alpha$ Discharge efficiency, and
$\eta_c \alpha$ Charge efficiency;

controlling, by the one or more computing devices or the one or more control devices in communication with the one or more computing devices, the renewable power generation; and generating and delivering power to the power grid according to the optimal RT generation schedule.

* * * * *